United States Patent
Migdal et al.

(10) Patent No.: US 6,356,263 B2
(45) Date of Patent: Mar. 12, 2002

(54) ADAPTIVE SUBDIVISION OF MESH MODELS

(75) Inventors: Alexander A. Migdal; Alexei Lebedev; Victor Paskhaver, all of Princeton, NJ (US)

(73) Assignee: Viewpoint Corporation, New York, NY (US)

( * ) Notice: Subject to any disclaimer, the term of this patent is extended or adjusted under 35 U.S.C. 154(b) by 0 days.

(21) Appl. No.: 09/238,232

(22) Filed: Jan. 27, 1999

(51) Int. Cl.[7] .............................................. G06T 15/30
(52) U.S. Cl. ...................... 345/423; 345/421; 345/442; 345/581
(58) Field of Search .............................. 345/423, 420, 345/425, 418, 442, 581, 421

(56) References Cited

U.S. PATENT DOCUMENTS

| | | | |
|---|---|---|---|
| 4,845,651 A | 7/1989 | Aizawa et al. | 345/425 |
| 4,888,713 A | 12/1989 | Falk | 345/425 |

(List continued on next page.)

FOREIGN PATENT DOCUMENTS

| | | |
|---|---|---|
| WO | WO 96/06325 | 2/1996 |

OTHER PUBLICATIONS

Agishtein, Michael et al, "Smooth Surface Reconstruction from Scattered Data Points", *Comput, & Graphics*, vol. 15, No. 1, pp. 29–39, 1991.

Agishtein, Michael et al., "Geometric Characteriztion of States in Two–Dimensional Quantum Gravity", submitted to *Physics Letters B*, pp. 1–12, Mar. 1990.

Agishtein, Michael et al., "Dynamics of Vortex Surfaces in Three Dimensions: Theory and Simulations", *Physica D 40*, pp. 91–118, 1989.

Certain, Andrew et al., "Interactive Multiresolution Surface Viewing", *SIGGRAPH 96 Conference Proceedings*, pp. 91–98, 1996.

Cohen, Jonathan et al., "Simplification Envelopes", *SIGGRAPH 96, Computer Graphics*, Aug. 1996.

(List continued on next page.)

*Primary Examiner*—Cliff N. Vo
*Assistant Examiner*—Kimbinh T. Nguyen
(74) *Attorney, Agent, or Firm*—Kenyon & Kenyon

(57) ABSTRACT

A computer-based system and method for refining of mesh model of a three-dimensional (3D) object or surface through adaptive subdivision that results in a smooth interpolation of the mesh surface. In one example, the system operates upon a triangulated mesh model and analyzes each edge of the triangle in question to determine whether that particular edge should be subdivided based on a predetermined subdivision criteria. After an analysis of each of the edges of that triangle (using the adaptive subdivision criteria) the system and method may make one of several different types of subdivisions—e.g. dividing the mesh triangle into two, three or four smaller triangles.

9 Claims, 22 Drawing Sheets

U.S. PATENT DOCUMENTS

| | | | | |
|---|---|---|---|---|
| 4,912,664 A | 3/1990 | Weiss et al. | ................ | 345/423 |
| 4,933,889 A | 6/1990 | Meshkat et al. | ............ | 345/423 |
| 4,941,114 A | 7/1990 | Shigyo et al. | .............. | 345/423 |
| 4,994,989 A | 2/1991 | Usami et al. | ............... | 345/420 |
| 5,107,444 A | 4/1992 | Wu | ............................ | 345/419 |
| 5,125,038 A | 6/1992 | Meshkat et al. | ............ | 382/154 |
| 5,189,626 A | 2/1993 | Colburn | ...................... | 345/420 |
| 5,193,145 A | 3/1993 | Akeley | ........................ | 345/423 |
| 5,214,752 A | 5/1993 | Meshkat et al. | ............ | 345/423 |
| 5,255,352 A | 10/1993 | Falk | ........................... | 345/425 |
| 5,257,346 A | 10/1993 | Hanson | ...................... | 345/425 |
| 5,303,386 A | 4/1994 | Fiasconaro | ................... | 345/419 |
| 5,345,490 A | 9/1994 | Finnigan et al. | ............ | 345/420 |
| 5,367,615 A | 11/1994 | Economy et al. | ........... | 345/429 |
| 5,377,011 A | 12/1994 | Koch | ......................... | 356/376 |
| 5,379,371 A | 1/1995 | Usami et al. | ............... | 345/428 |
| 5,398,307 A | 3/1995 | Arakawa | .................... | 345/423 |
| 5,410,644 A | 4/1995 | Thier et al. | .................. | 345/425 |
| 5,412,762 A | 5/1995 | Kondo | ........................ | 345/420 |
| 5,440,674 A | 8/1995 | Park | ............................ | 345/423 |
| 5,448,686 A | 9/1995 | Borrel et al. | ................. | 345/420 |
| 5,448,687 A | 9/1995 | Hoogerhyde et al. | ........ | 345/425 |
| 5,465,323 A | 11/1995 | Mallet | ......................... | 345/423 |
| 5,475,799 A | 12/1995 | Yoshioka et al. | ........... | 345/420 |
| 5,488,692 A | 1/1996 | Karasick et al. | | |
| 5,497,451 A | 3/1996 | Holmes | ....................... | 345/420 |
| 5,522,019 A | 5/1996 | Bala et al. | ................... | 345/419 |
| 5,553,206 A | 9/1996 | Meshkat | ..................... | 345/423 |
| 5,561,749 A | 10/1996 | Schroeder | ................... | 345/420 |
| 5,563,995 A | 10/1996 | Shirouzu | .................... | 345/441 |
| 5,579,454 A | 11/1996 | Billyard et al. | ............. | 345/421 |
| 5,581,673 A | 12/1996 | Kikuchi | ...................... | 345/423 |
| 5,590,248 A | 12/1996 | Zarge et al. | ................. | 345/421 |
| 5,602,979 A * | 2/1997 | Loop | ........................... | 345/423 |
| 5,617,322 A | 4/1997 | Yokota | ....................... | 345/420 |
| 5,630,039 A | 5/1997 | Fossum | ...................... | 345/434 |
| 5,677,846 A | 10/1997 | Kumashiro | .................. | 345/425 |
| 5,689,577 A | 11/1997 | Arata | .......................... | 345/423 |
| 5,710,878 A | 1/1998 | McCoy et al. | .............. | 345/429 |
| 5,731,817 A | 3/1998 | Hahs, Jr. et al. | ............ | 345/423 |
| 5,748,865 A | 5/1998 | Yamamoto et al. | ......... | 345/423 |
| 5,774,124 A | 6/1998 | Itoh et al. | .................... | 345/423 |
| 5,886,702 A * | 3/1999 | Migdal et al. | .............. | 345/423 |

OTHER PUBLICATIONS

DeRose, Tony et al., "Fitting of Surfaces to Scattered Data", In J. Warren, editor, *Curves and Surfaces in Computer Vision and Graphics III*, Proc. SPIE 1830:212–220, 1992.

Eck, Matthias et al., "Multiresolution Analysis of Arbitrary Meshes" Technical Report #95–01–02.

Hoppe, Hugues, "Generation of 3D Geometric Models from Unstructured 3D Points," Microsoft Corporation.

Hoppe, Hugues, "Surface Reconstruction from Unorganized Points", PhD thesis, Department of Computer Science and Engineering, University of Washington, Jun. 194 (TR 94–06–01).

Hoppe, Hugues et al., "Mesh Optimization", *Computer Graphics Proceedings, Annual Conference Series*, pp. 19–26, 1993.

Hoppe, Hugues, "Progressive Meshes", *SIGGRAPH 96 Conference Proceedings*, pp. 99–108, 1996.

Lindstrom, Peter et al., "Real–Time, Continuous Level of Detail Rendering of Height Fields", *SIGGRAPH 96 Conference Proceedings*, pp. 109–117, 1996.

Migdal, A.A., "Dynamically Triangulated Random Surfaces", *Nuclear Physics B*, Proc. Suppl. 9, pp. 625–630, 1989.

Schroeder, William, et al., "Decimation of Triangle Meshes", *Computer Graphics*, 26(2), pp. 65–80, Jul. 1992.

Shewchuk, Jonathan, "A Two–Dimensional Quality Mesh Generator and Delaunay Triangulator", Triangle Website, http://www.cs.cum.edu/People/quake/triangle.html,printed Mar. 16, 1997.

Turk, Greg et al., "Zippered Polygon Meshes from Range Images" *Computer Graphics (SIGGRAPH '94 Proceedings)*, 28(3):311–318, Jul. 1994.

"Basic Methods and Algorithms: Voronoi Diagrams, Delaunay Triangulation and Construction of a TIN" Internet site http://www.iko.no, printed Feb. 12, 1996.

"Multiresolution Modeling", Internet site http://www.cs.cmu.edu/afs. . d/www/multires, printed May 7, 1997.

Silicon Graphics Indigo$^2$ Impact website, http://www.sgi.com/Products/hardware/Indigo2/tech.html, printed Jun. 22, 1997.

Silicon Graphics Technoloby Website, http://www.sgi.com/Products/hardware/desktop/tech.html, printed Jun. 22, 1997.

* cited by examiner

⋮
↓ else if (only CAB and CBC are true) then recursively subdivide edges and triangles: ⎯710

Subdivide the edge:
  call EdgeSub(VBC,VAB)
Recursively subdivide triangles:
  call Sub(B, VAB, VBC)

Compare edge (A, VBC) and (C, VAB) and decide which is best to subdivide:
  Call ChooseLink(A, VBC, C, VAB) to decide on best edge to subdivide if (ChooseLink returns 1) then recursively subdivide
    call EdgeSub(C, VAB)
    call Sub(C, VAB, VBC)
    call Sub(C, A, VAB)
  else then
    call EdgeSub(A, VBC)
    call Sub(A, VAB, VBC)
    call Sub(C, A, VBC)

↓ else if (only CBC and CCA are true) then recursively subdivide edges and triangles: ⎯712

Subdivide edge:
  call EdgeSub(VBA,VBC)
Subdivide triangle:
  call Sub(C, VCA, VBC)

Compare edges (A, VCA) and (A, VBC) to decide which is best to subdivide:
  Call ChooseLink(A, VCA, A, VBC) to decide on best edge to subdivide.

if (ChooseLink returns 1) then recursively subdivide
    call EdgeSub(A, VBC)
    call Sub(C, VBC, VCA)
    call Sub(A, B, VBC)
  else then
    call EdgeSub(B, VCA)
    call Sub(B, VBC, VCA)
    call Sub(A, B, VCA)

⋮ else if (only CCA and CAB are true) then recursively subdivide edges and triangles: ⎬ 714

Subdivide the edge:
      call EdgeSub(VAB,VCA)
    Subdivide triangle:
      call Sub(A, VAB, VCA)

Compare edges (C, VAB) and (B, VCA) to decide which is best to subdivide:
      Call ChooseLink(C, VAB, B, VCA) to decide on best edge if (ChooseLink returns 1) then recursively subdivide
        call EdgeSub(B, VCA)
        call Sub(B, VCA, VAB)
        call Sub(B, C, VCA)
      else then
        call EdgeSub(C, VAB)
        call Sub(C, VCA, VAB)
        call Sub(B, C, VAB)

else if (only CAB is true) then recursively subdivide: ⎬ 716
    Subdivide the edge (C, VAB)
      call EdgeSub(C, VAB)
    Subdivide triangles:
      call Sub(C, A, VAB)
      call Sub(B, C, VAB)

else if (only CBC is true) then recursively subdivide:
    Subdivide the edge (C, VAB)
      call EdgeSub(A, VBC)
    Subdivide triangles:
      call Sub(A, B, VBC)
      call Sub(C, A, VBC)

else if (only CCA is true) then recursively subdivide:
    Subdivide the edge (B, VCA):
      call EdgeSub(B, VCA)
    Subdivide triangles:
      call Sub(B, C, VCA)
      call Sub(A, B, VCA)

( End Sub() )

FIG. 12C

ADAPTIVE SUBDIVISION OF MESH MODELS

FIELD OF THE INVENTION

This invention relates to three-dimensional ("3D") modeling of real-world objects, terrains and other surfaces by computer. In particular, the present invention relates to a system and method for smooth surface interpolation for arbitrary meshes.

COPYRIGHT NOTICE

Portions of the disclosure of this patent document contain material which is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND INFORMATION

There is great interest in the development of computer systems which enable users to generate accurate displays and reproductions of real world and fantasy objects, terrains and other 3D surfaces. A graphic display and manipulation system generates a mesh model of the object, terrain or surface, uses that mesh model as a basis to create the display or reproduction. A mesh model represents an object, terrain or other surface as a series of interconnected planar shapes, such as triangles, quadrangles or more complex polygons. More advanced graphic display systems provide rapid zoom and "walk around" capabilities (allowing the user to make his or her perceived vantage point appear to move closer to, farther from or about an object or surface).

A set of data points that describes the object or surface provides basic data for the mesh. The data points, in many cases, represent actual, measured points on the object, surface or terrain. Values for such measured data points may come from a number of sources. A user can input data points based on measurement or planned architecture or they can be generated through scanning and other measuring systems. A scanning system uses a light source such as a laser stripe to scan and a camera to collect images of the scanning light as it reflects from the object. A scanning system processes the information captured in the images to determine a set of measured 3D point values that describe the object, surface or terrain in question.

Typical mesh modeling systems use data points (such as measured data points) to create meshes of the object, surface or terrain. When modeling a complex object, the meshes often have sharp changes of surface contour in localized areas of detail. For example, when modeling a human face, the area of the mesh model for the nose or the eyes will usually have more changes of contour than the surface area of the cheek. In some circumstances the model designers will sometimes wish to heighten or further refine the contours in these areas to provide a model of the object which is more realistic in appearance or which has a special focus.

Traditional tools of 3D modeling include the use of Bezier splines, Non-Uniform Rational B-Splines (NURBS) and other types of patch based surface modeling. These tools are efficient for simple shapes such as boxes, spheres and cylinders, but quickly become awkward for constructing and providing a sufficient level of detail resolution for surfaces that are more irregularly shaped, such as organic shapes resulting from 3D scanning. As the terrain of a complex object changes rapidly, and in a random fashion, a global function calculation, such as a B-Spline, requires a significant portion of the computer's resources and may not provide a model that has sufficient detail in the areas of interest. Thus, for mesh models of irregularly shaped surfaces, such as real-world or fantasy objects, surfaces or terrains, there is a need for the development of new computer tools for permitting refinement to such complex surfaces. In mathematical terms, one problem to be solved can be stated as follows: Given a base mesh, such as a triangulated surface, how can the mesh be refined to produce a smooth surface that passes through all of the initial vertices orthogonal to the initial normal vectors at each of the vertices.

Over the last decade, developers have made attempts to create algorithms for refining the detail of complex, irregular surfaces. One generally known approach, is the so-called "subdivision of surfaces" technique. As applied to the smoothing of 3D triangulated meshes, this technique seeks to recursively subdivide all of the triangles of the mesh into four-sub triangles, until the desired level of detail is reached. FIG. 1 shows an example of this subdivision of a single triangle 1 into a triangulated mesh having original vertices 11, 12, and 13. The edges 2, 3, 4 of triangle 1 are subdivided by adding new vertices 21, 22, and 23 at the midpoints of each edge 2, 3, 4 of triangle 1. These new vertices can be determined or extruded based on an extrusion algorithm and four new triangles 31, 32, 33 and 34 can be rendered. Each of these smaller triangles 31–34 may also be subdivided and extruded in a similar manner to further refine the mesh.

However, there are drawbacks to the subdivision of surfaces technique, including a likelihood of overwhelming a computer's resources. In certain implementations, each global subdivision using this technique quadruples the used memory. For example, a mesh having 10,000 triangles would have 40,000 triangles after the first iteration of a subdivision. Such subdivision could quickly overwhelm the memory resources of the computer, causing it to be unable to render and animate such a surface after a small number of subdivisions. In addition, this type of recursive subdividing produces a uniform surface geometry when each triangle is always subdivided in the same manner. These subdivisions may not create a surface which passes through the orthogonals of the initial vertices in an efficient manner. Accordingly, there is a need for new techniques to subdivide a mesh model in a way which would provide greater accuracy and efficiency in terms of subdivisions which create a surface that best passes through all of the initial vertices orthogonal to the initial normals and which also uses the available computing resources in the most efficient manner. In the search for better mesh modeling systems, it is important to look at criteria such as:

how to avoid doing unnecessary subdivisions at smooth areas;

how to determine or extrude the middle points of the edges;

how to guarantee numerical stability and robustness; and how to achieve real-time performance using commonly available computer equipment.

One goal is to prevent unnecessary subdivisions with a algorithm that is adaptive so that it permits the making of an efficient subdivision at any level of recursion. The second issue pertains to the mathematical accuracy of the subdivision. The extrusion technique should provide a certain smoothness of the surface in the limit of infinite subdivision. Additionally, normal vectors to this limiting surface have to interpolate those at the base mesh vertices, which requirement gives another restriction on the extrusion algorithm.

The third issue pertains to practical implementation. "Bad" areas, such as high peaks may produce instabilities at each level of subdivision, which may go to infinity in the limit of infinite level. The last issue has to do with computational complexity. The algorithm should take linear time. Moreover, very few operations should be performed in every triangle, so that speeds of, for example 10 frames/sec, can be achieved by using available computer hardware, such as an Intel Pentium II™ processor.

With problems such as these solved, adaptive subdivision may become a basic tool of 3D graphics, like Gourand shading. Hardware acceleration may lead to speeds of 30 frames/sec or more, after which a new level of realism in 3D graphics can be achieved. However, to date there are no tools which can produce a smooth mesh model with the desired efficiency, detail and accuracy.

SUMMARY OF THE INVENTION

The present invention provides a computer-based system and method for the adaptive subdivision of mesh model of a three-dimensional (3D) object or surface that results in a smooth interpolation of the mesh surface. The mesh model has a set of connected faces, with each face being a geometric shape with a predetermined number of vertices and a corresponding number of edges. Each edge connects two of the predetermined number of vertices. The system adds detail to the mesh model through the adaptive subdivision of the faces of the mesh model.

In the exemplary embodiment which operates upon a triangulated mesh model, the system of the present invention analyzes each edge of the triangle in question to determine whether that particular edge should be subdivided based on a predetermined subdivision criteria. After an analysis of each of the edges of that triangle (using the adaptive subdivision criteria) the system and method of the present invention makes one of several different types of subdivisions—e.g. dividing the mesh triangle into two, three or four smaller triangles.

When analyzing each edge of the triangle, the system and method of the present invention will determine the 3D coordinates for a point which will subdivide that triangle edge and compute other information that would be related to that point, such as normal information (and other information such as attribute information like, color or shine (reflectivity) information). When a triangle's edge is subdivided, each edge segment can also be further analyzed to determine whether it will need to be further subdivided. Once each edge is analyzed, and the subdivision points generated, the triangle can be subdivided and new triangles adding additional detail or refinement to the mesh.

In an exemplary embodiment, a subdivision element receives data concerning one of the triangles to be analyzed and then checks the first edge (by checking the data associated with the vertices for that edge) against a predetermined subdivision criteria. The subdivision criteria can analyze mesh edge and data point characteristics such as the length of the edge (subdividing the edge if the length greater than a predetermined threshold) or the angle between the normal vectors at the two edge vertices (subdividing the edge if the angle is greater than a predetermined threshold). However, the meshing system of the present invention can be arranged to analyze other attribute information associated with the mesh or its data points, such as color or shine (reflectivity) information and make subdivision determinations based on those criteria as well. When an edge meets the predetermined subdivision criteria, an extrusion element determines the coordinate and other mesh attribute information that is to be associated with the new subdivision point. In the exemplary embodiment, the coordinates are smoothly interpolated so that they will lie on a curve that passes through the vertices of the first edge orthogonal to the normal vectors at the first edge vertices. (Values for other attributes of the data point such as color would be interpolated based on the data associated with the original vertices in much the same manner).

If a determination is made to subdivide a triangle's edge, the system and method of the present invention, will (e.g. in a recursive procedure) further analyze the subedges formed by the newly created data point and the original edge vertices to determine if further subdividing of those subedges is necessary. When analysis of an edge is completed, the system and method of the present invention continues to analyze the other edges in the original triangle to determine whether those edges require subdivision(s). After each edge of a triangle is analyzed, the system and method of the present invention will subdivide the triangle into further subtriangles, e.g making either a double (two triangle), triple (three triangle) or quadruple (four triangle) subdivision, depending upon the number of edges that were determined to need subdivision. The system then proceeds (e.g. in a recursive procedure) to analyze those newly created subtriangles to determine if further subdivisions are necessary within them.

DETAILED DESCRIPTION

The present invention provides an efficient system and method for adaptive subdivision of triangulated surfaces. An exemplary process according to the present invention, checks the edges of a selected triangle against a subdivision criteria to determine whether the edge should be subdivided. In the exemplary embodiment, the specific subdivision criteria chosen seeks to maintain surface continuity of the mesh model after subdivision is performed. If an edge is to be subdivided, a subdivision point is selected for each edge and an extrusion process determines the coordinate of the new point using interpolation so that a smooth curve, approximating the object or surface, runs through the new subdivision point and the vertices of the original edge. (Other information associated with the data points of the mesh such as normal and other attribute information (such as color) can also be determined for the new subdivision point). New triangles are formed using the newly inserted subdivision points and the new triangles are subdivided (e.g. recursively), if required, using the same criteria. In this manner, the present invention refines the mesh model either in whole or in part to the desired level of surface smoothness.

The system and method of the present invention described herein is implemented using computer program code and a computer comprising a processor, memory and graphics rendering capability. In the exemplary embodiment, the software is programmed using the C++ programming language and that software may be run on any graphics workstation platform supporting a C++ compiler. PC computers that have Intel Pentium™ host processors, a graphics operating system, memory (e.g. 256 Mb of RAM or more) operational capabilities of 200–400 MHZ (or higher), and graphics processing capability that supports rendering such an Gouraud shading are suitable for implementing the present invention. Other graphics or visual workstations such as the $O^2$ systems sold by Silicon Graphics Inc. are also suitable.

In the present invention, both the level of detail refinement, based on the subdivision criteria value, and the area of the mesh model to be enhanced with additional detail are selectable by the user. It is also understood that selecting the area of a mesh model to be smoothed can be performed by any of numerous known methods, for example, by a computer program that provides a user the options of clicking and dragging a mouse over a desired area in a mesh and those selected triangles will be analyzed for adaptive subdivisions. Also, since both the level of detail refinement and the area that will be refined by adaptive subdivision are selectable, the user can have varying level of detail refinement selected for different areas of the same mesh model depending on the requirements of the specific user.

Figure 1:
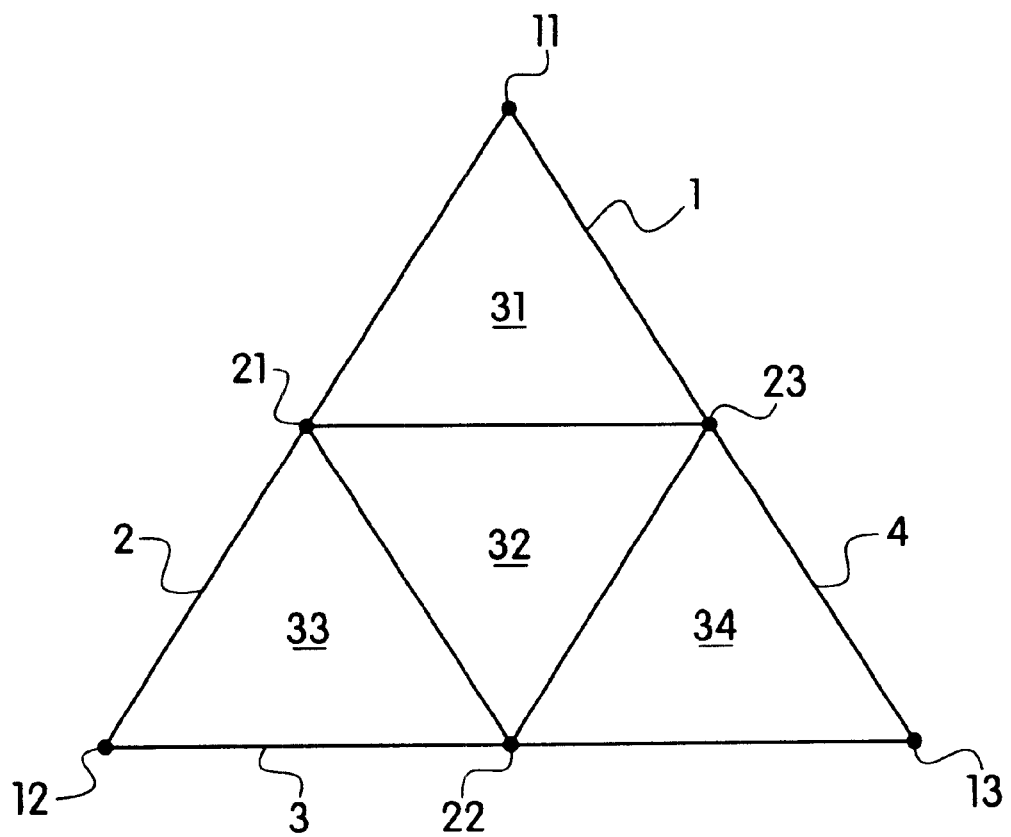
FIG. 1 shows subdivision of a triangle using quadruple subdivision.

The system and method of the present invention allows the triangle to be subdivided in any one of a number of manners and is not limited only to subdividing a mesh triangle in one manner, for example, the quadruple subdivision described above with respect to FIG. 1. For example, for purposes of an exemplary embodiment, the present invention includes two other types of subdivisions, a double subdivision and a triple subdivision. A double subdivision of the present invention divides a mesh triangle into two sub-triangles. In the exemplary embodiment, the line creating the subdivision is formed using one of the vertices of the existing triangle and a new vertex inserted along the edge opposite the original vertex. The new vertex may be called the subdivision point. A triple subdivision subdivides a mesh triangle into three sub-triangles. In the exemplary embodiment, the subdivision is formed with two lines, the first line formed using one vertex of the existing triangle and a new vertex inserted along the edge opposite the original vertex. The second line is formed using the new vertex and a second newly inserted vertex inserted in either one of the opposite edges from the first newly inserted vertex. Once again, these newly inserted vertices may be referred to as subdivision points. The double subdivision and triple subdivisions of the present invention each have a number of variations.

Figure 2A:
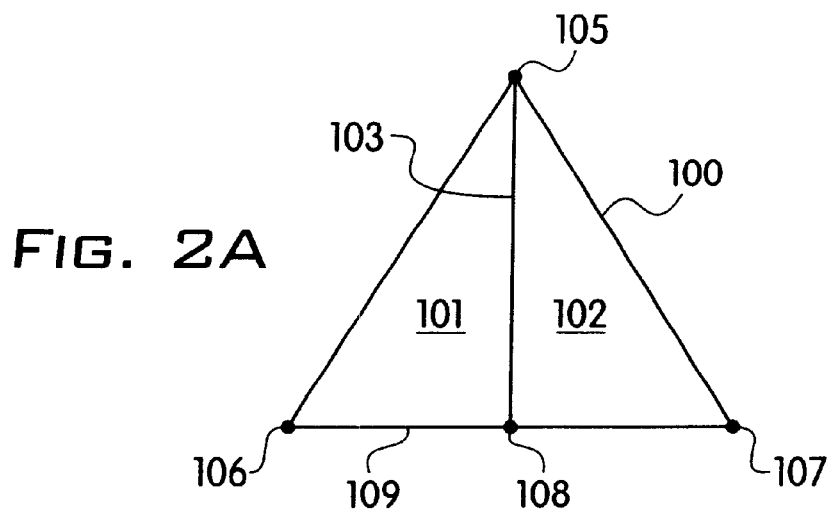
FIGS. 2a–c show subdivision of a triangle using double subdivision according to an exemplary embodiment of the present invention.
Figure 2B:
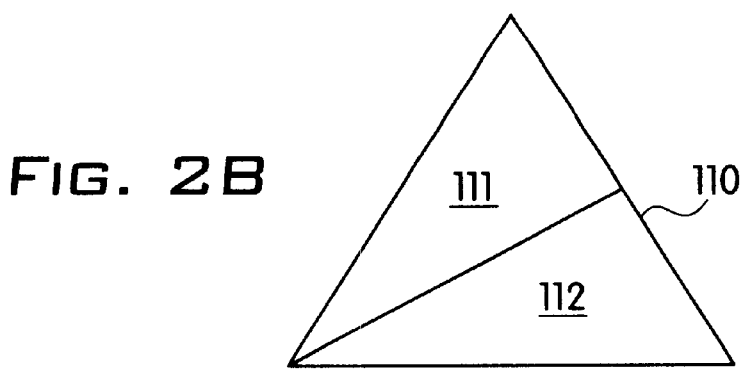
Figure 2C:
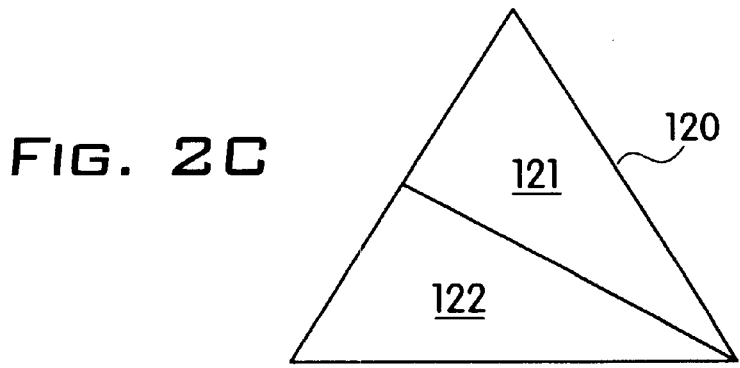

FIGS. 2a–c show the three variations of double subdivision. FIG. 2a shows triangle 100 having original vertices 105, 106 and 107. Triangle 100 is subdivided by a new edge 103 from e.g., the midpoint 108 of the original edge 109 to original vertex 105. This new edge 103 creates two new triangles 101 and 102 from original triangle 100, thus a double subdivision. Similarly, FIG. 2b shows a double subdivision of triangle 110 into new triangles 111 and 112 as a second variation, and FIG. 2c shows a double subdivision of triangle 120 into new triangles 121 and 122 as a third variation.

Figure 3A:
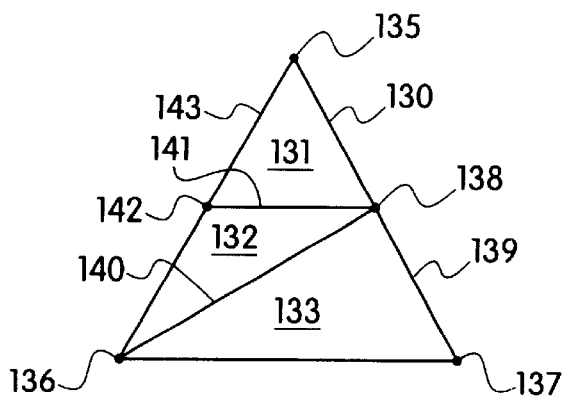
FIGS. 3a–f show subdivision of a triangle using triple subdivision according to an exemplary embodiment of the present invention.
Figure 3B:
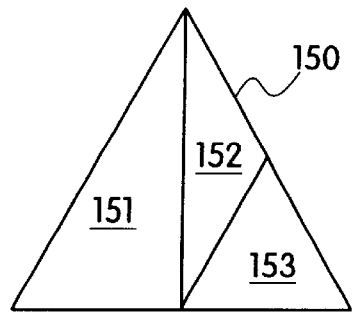
Figure 3C:
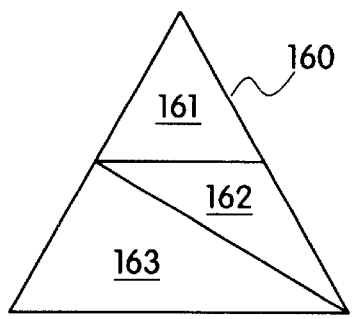
Figure 3D:
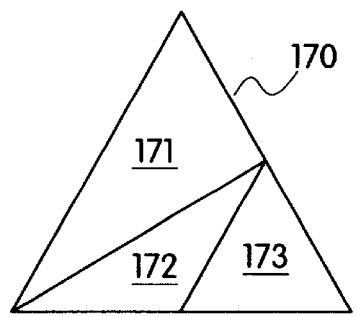
Figure 3E:
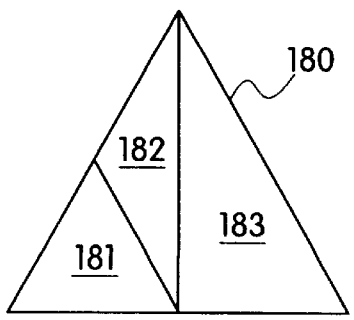
Figure 3F:
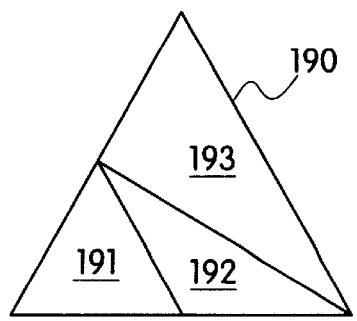

FIGS. 3a–f show the six variations of triple subdivision. FIG. 3a shows triangle 130 having original vertices 135, 136 and 137. Triangle 130 is subdivided by a new edge 140 from, e.g., the midpoint 138 of the original edge 139 to original vertex 136 and by new edge 141 from, e.g., midpoint 138 of original edge 139 to, e.g., midpoint 142 or original edge 143. These two new edges 140 and 141 create three new triangles 131, 132 and 133 from original triangle 130, thus a triple subdivision. Similarly, FIGS. 3b–f show the other five variations of triple subdivision.

The examples of double subdivision and triple subdivision illustrated by FIGS. 2 and 3, respectively, use the midpoint of the edges as the subdivision point. However, those skilled in the art will understand that the teaching of the present invention is not limited to the subdivision point being at the midpoint of an edge, the present invention may be implemented using any point along the edge as the subdivision point with that point being determined by techniques which will more smoothly approximate the surface of the mesh according to the desired criteria.

In the exemplary embodiment, the decision whether to subdivide an edge is based on the information located in the two vertices of the edge being checked for subdivision a data point generally provides the X, Y, Z, 3D spatial location of the point's location within the mesh model. However a data point may also have associated with it other information such as normal vector data, (e.g. vertex normals reflecting the normal of the object surface at the data point, and corner normals which are normal vectors for the triangles to which the data point is connected from the data points "corner" of the triangle). Other attribute data, such as a red, green, blue (RGB) (or other color model) color value or reflection data can also be associated with the data point. This coordinate and other data can be examined respect to each edge to determine whether an edge subdivision is to be made. In the exemplary embodiment, the present invention uses the length of an edge as a subdivision determining criteria but using similar techniques (such as by analysis of "color length" in a RGB color space) subdivision determination functions can be based on, or include other non-spatial attribute information.

Figure 4:
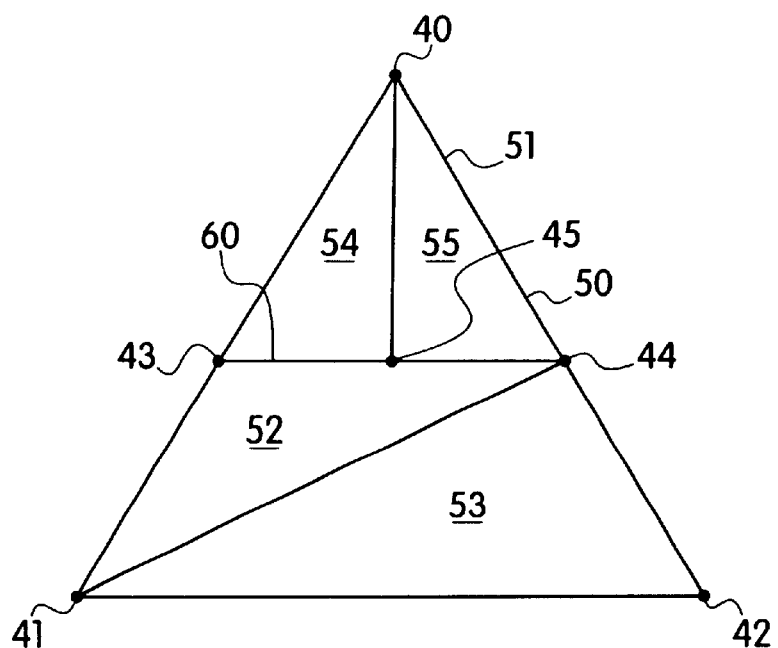
FIG. 4 shows a non-symmetric subdivision of a triangle.

In examining the data for the two vertices of an edge, the present invention employs a procedure in which a subdivision determination for an edge will be applied to both triangles that share the edge. This symmetry of subdivision permits one triangle to be subdivided infinitely or to a selected level of subdivision, while maintaining continuity of the surface after the subdivisions. Because non-symmetric subdivision criteria can allow different subdivision decisions being made for an edge shared by two adjacent triangles, use of non-symmetric subdivision criteria can lead to violations of continuity after extrusion. For example, some non-symmetric criteria include using a distance function that would calculate a distance from only one of the vertices or using a function that calculates the area of the triangle (this function is non-symmetric because it depends upon a third vertex which is different in two adjacent triangles). For example, FIG. 4 shows mesh resulting from a non-symmetrical criteria. In FIG. 4, triangle 50 having vertices 40, 41, 42 was subdivided using a triple subdivision. The result of this triple subdivision is that new triangles 51, 52 and 53 are formed with the addition of new vertices 43 and 44. Then triangle 51 having vertices 40, 44, 45 was subdivided by double subdivision into new triangles 54 and 55 with the addition of vertex 45. However, a subdivision that ends here is non-symmetrical because triangles 51 and 52 share edge 60 defined by vertices 43 and 44. As shown in FIG. 4, edge 60 was subdivided causing triangle 51 to become triangles 54 and 55, but triangle 52 sharing edge 60 was not subdivided. This non-symmetry violates surface continuity and shows the results of non-symmetrical subdivision criteria.

In the exemplary embodiment, the criteria for subdivision is symmetrical. Symmetrical subdivision criteria includes those parameters that can be associated with both vertices of a particular edge to be subdivided. One exemplary symmetrical subdivision criteria is a procedure that determines whether the square of the distance between the vertices' coordinates of the edge to be subdivided is greater than a threshold value and determines that if the length of the edge created by the two vertices is greater than a threshold value, the edge should be subdivided. Another exemplary symmetrical subdivision criteria would examine the normal vertex of the two edge vertices and if the angle between the vertex normals of these two vertices is greater than a threshold value. It is noted that for arbitrary symmetric criterion based on two vertices, the recursive subdivisions will preserve the triangulation at every level of subdivision in any triangle, i.e., so long as symmetric subdivision is used there will only be triangles in the resulting mesh and no other geometric shapes. Thus, embodiments of the present invention which employs symmetrical rather than non-symmetrical subdivisions determining criteria will have this characteristic.

A further consequence of a symmetrical subdivision technique is that the triangles can be subdivided sequentially, rather than all at once and that can provide computational and processing efficiencies such as a saving of memory space and processor resources. A subdividing system constructed with the present invention may apply recursive techniques to analyze all or selected edges of a mesh and perform subdivisions following this a symmetrical subdivision technique. With such a technique, each original triangle of the original base mesh can be subdivided, extruded, rendered and recursively subdivided, if needed, into thousands of smaller triangles. When the first triangle is refined to the desired level of smoothness, the memory space used to store the variables needed for these smaller triangles can be released. The next triangle of the base mesh can then be subdivided, extruded, rendered and recursively subdivided, if needed, using the same memory space allocated for the smoothing of the first triangle since that memory space was released. The subdivision procedure may continue through all the triangles of the original mesh or selected portions of the mesh until the desired smoothness is attained. Thus, it is possible to subdivide the entire mesh using the same limited memory space, because, in general, the decisions are made independently for each triangle, without resort to connectivity information which relates one triangle to another in the mesh, such as that described in U.S. application Ser. No. 08/881,874 entitled System and Method for Computer Modeling of 3-d Objects and 2-d Images by Mesh Constructions That Incorporate Non-spatial Data Such as Color or Texture and U.S. application Ser. No. 08/730,979 System and Method for Computer Modeling of 3d Objects or Surfaced Mesh Constructions Having Optimal Characteristics and Dynamic Resolution Capabilities, which are expressly incorporated herein by reference. This exemplary embodiment, using the above described technique, can save both memory and processor processing time, by not using the typical connectivity information, but, instead using a symmetrical process to perform triangle subdivision and sending the subdivided triangles (those triangles which will not be further subdivided) to the rendering computer's graphics pipeline one by one, immediately releasing memory after these triangles are rendered. (Alternatively, information concerning the triangles subdivisions, e.g., the subdivision points' coordinates and attribute information and even connectivity information can be saved for later use.)

Figure 5:
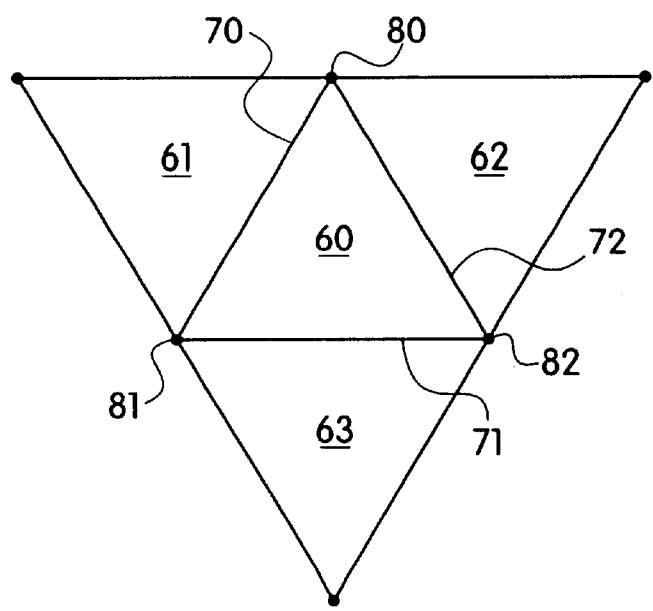
FIG. 5 shows an exemplary portion of mesh model approximating an object or surface.

As part of this processing technique of the present invention, it is noted that subdividing information concerning each edge of the triangle that has been analyzed for subdivision may be maintained in memory until the triangle adjacent to it have been subdivided. For example, FIG. 5 shows four triangles 60–63 of a mesh model that has yet to be subdivided (i.e. there are one base mesh triangles). In FIG. 5 the first triangle to be subdivided is triangle 60. Based on the desired level of detail, the system can be recursively subdivide triangle 60 into thousands of new triangles and information concerning these subdivisions can be either rendered and released (or stored for later use as described above). However, if the original mesh is maintained under the technique described above, edge 70 having vertices 80 and 81 will be maintained in memory even after the recursive subdivision; information concerning new vertices between vertices 80 and 81 may be stored in a data location associated with the edge or its triangle. This information can also be used subdivide the adjacent triangle in a symmetrical manner. As described above, according to the present invention, the principles of symmetric subdivision provide that a shared edge of adjacent triangles be subdivided symmetrically for the adjacent triangles. For example, in FIG. 5, every new vertex added on edge 70 between vertices 80 and 81 during the recursive subdivision of triangle 60 will be a vertex of a new triangle formed within the bounds of triangle 60, but will also be a vertex formed in triangle 61 when it is subdivided (recursively or otherwise). Thus, for each shared edge of the original triangle, the subdivision information will remain in memory until the triangle sharing that adjacent edge is subdivided. The nature of the information stored for the subdivision includes the coordinate and normal data for each vertex. This limited retention of data allows for faster subdivision as it alleviates the need to perform the above described determination step on an edge previously subdivided. Of course, it is also possible to store information regarding added points in, for example, a file, so that the information could be utilized at a later time.

Figure 6:
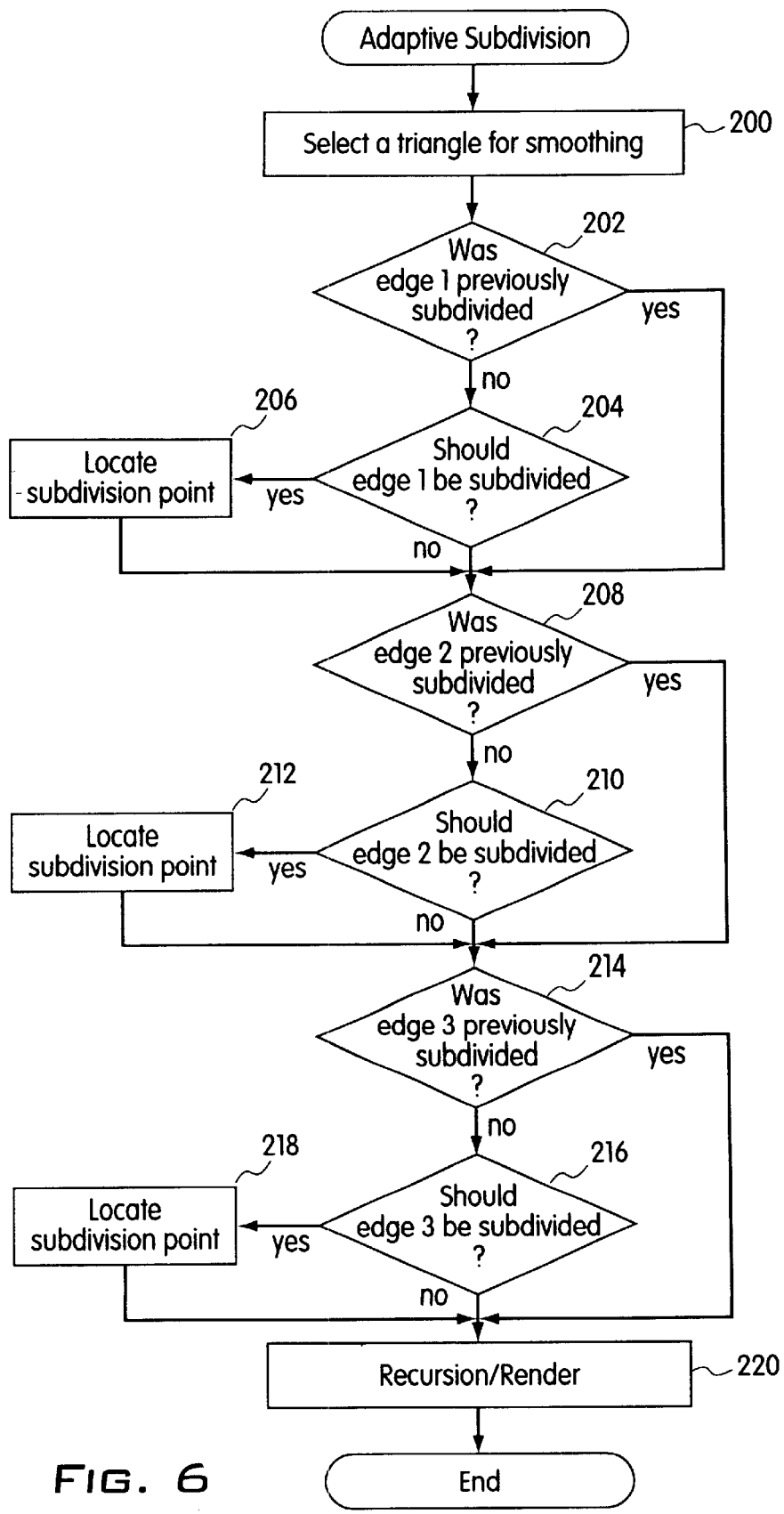
FIG. 6 shows an exemplary process for adaptive subdivision according to the present invention.

FIG. 6 illustrates an exemplary control process for the adaptive subdivision according to the present invention. The process relieves data point information for the data points of a selected triangle in the mesh (e.g., X, Y, Z coordinate information, normal vector information and other associate information, e.g., such as color information. The process checks in sequence the three edges of the selected triangle to determining for each edge whether or not that edge should be subdivided. If only one edge of that triangle should be subdivided, then the process will execute a double subdivision for the triangle, as described above with reference to FIGS. 2*a–c*. If two edges are determined to require subdivision, then the process performs a triple subdivision for that triangle, as described above with reference to FIGS. 3*a–f*. If all three edges are determined to require subdivision, then the process executes a quadruple subdivision, as described above with reference to FIG. 1. For each of the newly created triangles the process stores in memory a record with the subdivision information of the original edge and then recursively calls the procedure for each newly created triangle. After the recursion is complete, i.e., the triangle and the end of the recursion sequence no longer requires subdivision), the system renders the triangle and releases the used memory.

In step 200 of FIG. 6, a triangle to be refined is selected and boundary vertices are initialized for that triangle. There is no particular need to start with a specific triangle, any selection criteria will suffice. For example, the process shown in FIG. 6 can be incorporated within a modeling tool or other computer function by which a user might select, for example, an area of a mesh model or a set of triangles to be refined. As described above, with an initial mesh generated by scanning or direct input of the data points, each of the vertices in the original mesh represent actual, measured data points on the object, surface or terrain and one of the desired goals is to improve the mesh by making refinements that create a mesh surface that passes through these initial vertices on a trajectory that is orthogonal to the initial normal vectors of these vertices. These data points are the vertices of the triangles in the initial mesh, and will be the boundary vertices for the original triangle that will be subdivided. As the triangle is recursively subdivided, newly added vertices will become boundary vertices for the new triangles which arise as a result of the subdivision. The boundary vertices define the edges of triangle that will be subdivided.

Step 202 shows that the process first checks to determine whether the first edge (any one of the three edges may be selected) has previously been subdivided, e.g., it determines if this edge was previously analyzed as part of an adjacent triangle. As described above, this information is stored in a memory location that is associated with the triangle in question. If no previous subdivision determination has been made for this edge, the process proceeds to step 204 to determine whether the edge should be subdivided. For example, this determination may be made as a function of the length of the edge in question and may require a subdivision if the length is greater than a predetermined threshold. Alternatively the determination may be made as a function of the angle between the vertex normals of the two vertices, and may require a subdivision if the angle is greater than a threshold value. It should also be understood that these criteria are not an exhaustive list of the possible criteria, as described above, and other criteria may be used including symmetric determinations made using attribute data such as RGB or other color information.

If the edge is to be subdivided, the process then proceeds to step 206 to determine the location of the subdivision point using a formula to locate that point along the edge that results in the smoothest curve, approximating the object or surface, that runs through the subdivision point and the original vertices (an "extrusion formula"). The coordinates and normals of the subdivision point will be used to create either a double, triple or quadruple subdivision as described above. An exemplary extrusion formula is also described in further detail below.

If the first edge was previously subdivided as determined in step 202, if the first edge does not need to be subdivided as determined in step 204, or after the subdivision point location is determined in step 206, the process proceeds to step 208 to determine whether the second edge of the triangle was previously subdivided. If no previous subdivision has been made for this edge, the process proceeds to step 210 to determine whether the second edge should be subdivided following the procedure as described above with reference to step 204. If the edge is to be subdivided, the process proceeds to step 212 to determine the location of the subdivision point following the process described in step 206 (e.g., using the extrusion formula which will be described in greater detail below) and storing information for the subdivision point in a data location in memory associated with the edge.

If the second edge does not need to be subdivided as determined in step 210, or after the subdivision point location is determined in step 212, the process proceeds to step 214 to determine whether to determine whether the third edge of the triangle was previously subdivided. If no previous subdivision has been made for this edge, the process proceeds to step 216 to determine whether the third edge should be subdivided following the procedure as described above with reference to step 204. If the edge is to be subdivided, the process proceeds to step 218 to determine the location of the subdivision point following the process described in step 206.

Having examined each of the three edges, the process then proceeds to step 220 to determine whether it will either render the triangle in question (if no edge has been subdivided) or subdivide the triangle and recursively determine whether further subdivisions are needed. If in step 220, the process has determined that any edge has been subdivided, as described above, the process then uses the provided vertices to make one of three sets of recursive calls according to the following case:

Case 1: Only one edge of the triangle requires subdivision, resulting in double subdivision creating triangles 1 and 2
  Call Adaptive Subdivision for new triangle 1
  Call Adaptive Subdivision for new triangle 2
  For example, if in FIG. 2a, edge 109 is considered the first edge and the only edge that needs to be subdivided, then a double subdivision is performed creating new triangles (102) and (103). The adaptive subdivision is then called for both to further subdivide these new triangles, until no further subdivisions are required.

Case 2: Two of three edges of the triangle require subdivision resulting in triple subdivision creating new triangles 1, 2 and 3:
  Call Adaptive Subdivision for new triangle 1
  Call Adaptive Subdivision for new triangle 2
  Call Adaptive Subdivision for new triangle 3
  For example, if in FIG. 3a, edges 139 and 143 are considered the first and second edge respectively and both of these edges require subdivision, then a triple subdivision is performed creating new triangles (131), (132) and (133). The adaptive subdivision routine is then called for each of these new triangles until no further subdivisions are required.

Case 3: All three edges of the triangle requires subdivisions, resulting in quadruple division creating new triangles 1, 2, 3 and 4:
  Call Adaptive Subdivision for new triangle 1
  Call Adaptive Subdivision for new triangle 2
  Call Adaptive Subdivision for new triangle 3
  Call Adaptive Subdivision for new triangle 4
  For example, if in FIG. 1, edges 2, 3 and 4 are considered the first, second and third edge, respectively, and all of these edges require subdivision, then a quadruple subdivision is performed creating new triangle 1 (31), new triangle 3 (32), new triangle 3 (33) and new triangle 4 (34). The adaptive subdivision routine is then called for each of these new triangles, until no further subdivisions are required.

If in step 220, the process determines that no edge of the triangle has been subdivided then the process will output a command to the graphics driver (the graphics pipeline) to render the triangle in question, stop the recursion process for that triangle and return to the calling process any subdivision information it has for the edges of that triangle.

Figure 7:
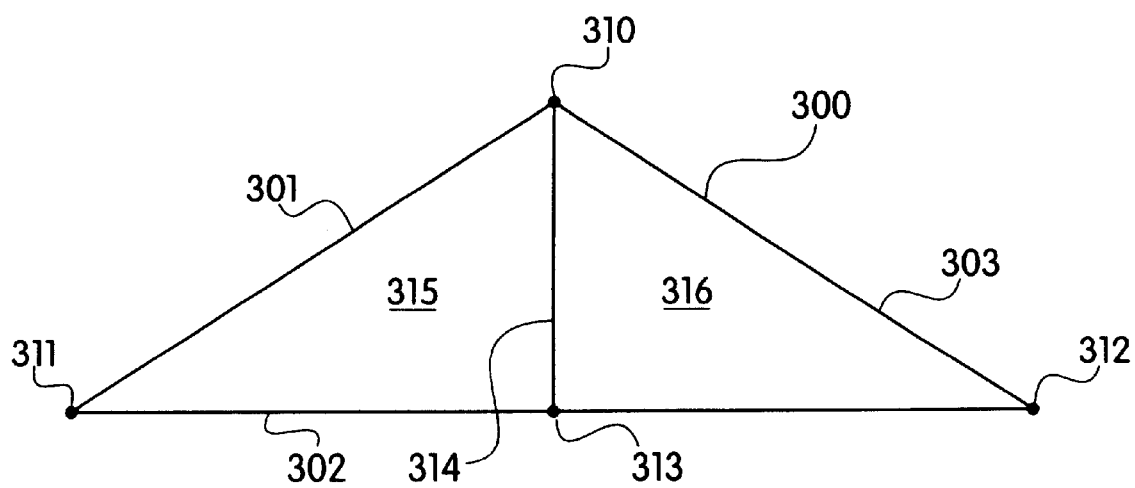
FIG. 7 shows an exemplary subdivision of a triangle according to an exemplary embodiment of the present invention.
Figure 8A:
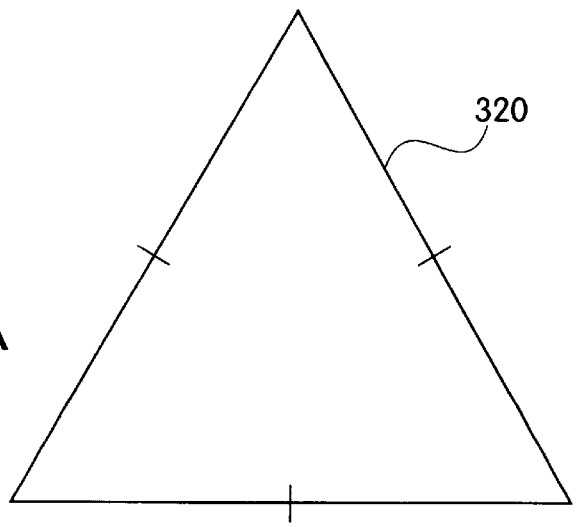
FIG. 8 shows an exemplary subdivision of a triangle according to an exemplary embodiment of the present invention.
Figure 8B:
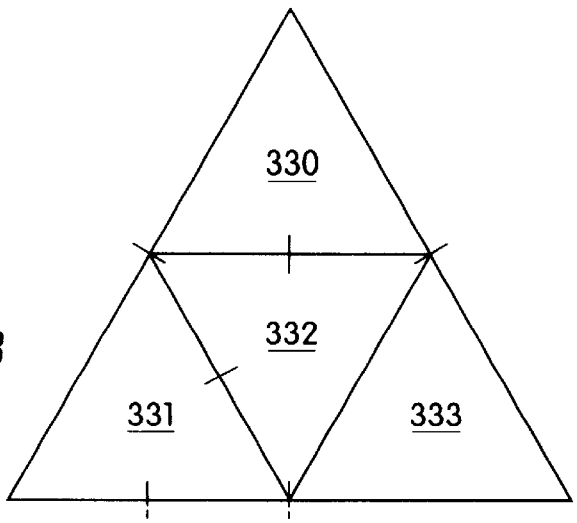
Figure 8C:
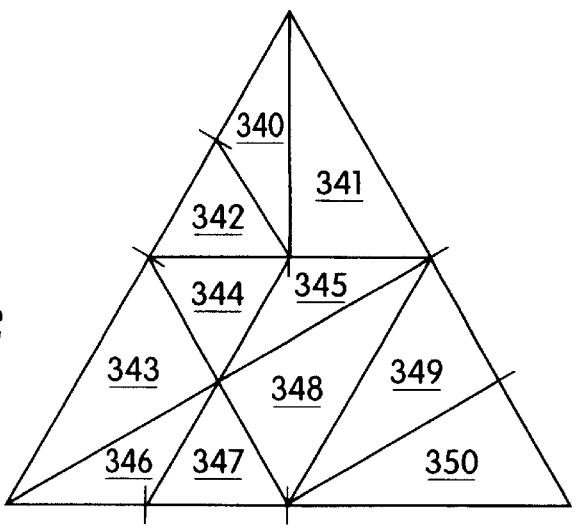

FIG. 7 illustrates a triangle 300 that is subjected to the recursive subdivision process described in FIG. 6. Initially boundary vertices 310, 311 and 312 are defined. The first edge 301 is tested against the subdivision criteria to determine whether the edge needs to be subdivided. In this case, edge 301 does not require subdivision. Then the second edge 302 is tested against the subdivision criteria. In this case, it is determined that edge 302 requires subdivision and that point 313 is the subdivision point. Finally, the third edge 303 is tested against the subdivision criteria and it is determined that this edge does not require subdivision. In this case, since only a single edge requires subdivision, double subdivision will occur by connecting newly inserted point 313 with original vertex 310 as depicted by the line 314. The recursive subdivision process will call itself once for each of the newly created triangles 315, 316 to determine if any of the edges of these newly created triangles need to be further subdivided. As shown in the above example, double subdivision occurs when only one of the edges needs to be subdivided. If two edges need to be subdivided, triple subdivision occurs. Finally, if all three edges need to be subdivided quadruple subdivision occurs. FIGS. 8a–c illustrates original triangle 320 as it is recursively subdivided into triangles 340–350. As shown, each subdivision is making either a double, triple or quadruple subdivision, however for each subdivision the triangulated mesh quality is preserved.

The following description and figures will describe in more detail the process of adaptive subdivision according to the present invention and an exemplary extrusion formula. Referring back to step 200 of FIG. 6, the boundary vertices of a triangle to be analyzed by the adaptive subdivision routine of FIG. 6 can be defined as V0, V1, and V2 with each vertex having associated coordinates, e.g. X,Y,Z coordinates (r0,r1,r2) and normals (n0,n01,n02). When the adaptive subdivision routine is called, the parameter passed to the subroutine will include the associated coordinates and the normal value for each vertex V0, V1, and V2 of the triangle to be analyzed. For example, vertex V0 will have associated coordinates r0 and normal n0, with n0 which is a vertex normal vector representing a vector that is normal to the tangent of the curve of the surface of the object depicted—which may be approximated by averaging the normals of all of the triangles to which it is connected in the model (a "vertex normal"). As described above, the data points of the original mesh are, for the purposes of the exemplary embodiment, points representing the actual object or surface that is being modeled. Thus, the vertex normal may be, for example, a normal representing the true surface at the given point. Additionally, each vertex V0, V1 and V2 will have associated with it, in addition to its vertex normal, a set of corner normal vectors which correspond to the normals of each triangle that is associated with the vertex. Corner normals for adjacent triangles are defined as the normal in corner of the neighboring triangle across edge ij. Thus, for vertex V0, there will be associated with the point normal a set of corner normals n01, n02, etc.

Figure 9:
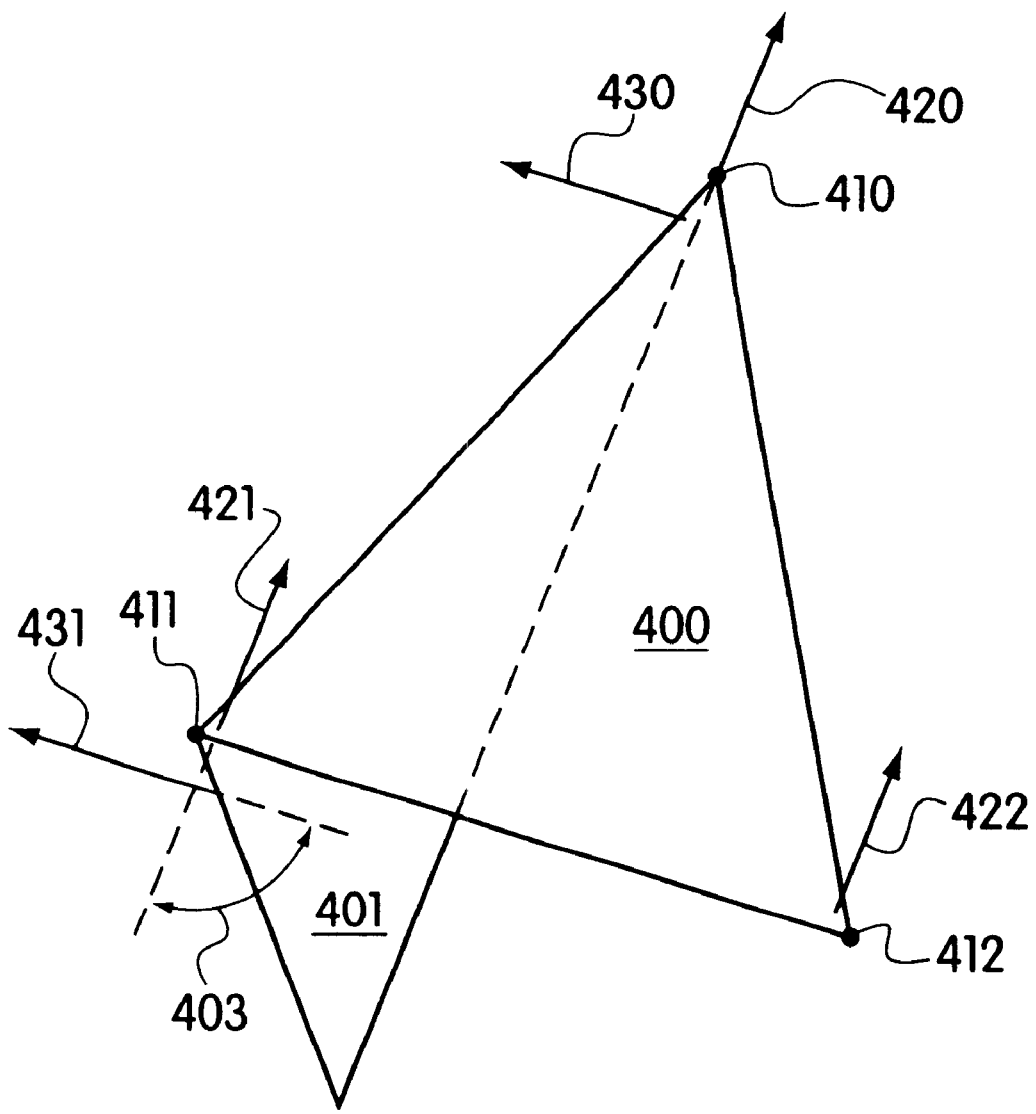
FIG. 9 shows two triangles of a mesh model having normals defined according to an exemplary embodiment of the present invention.

FIG. 9 shows the triangle to be subdivided as triangle 400 having boundary vertices 410, 411 and 412. Boundary vertex 410 (V0) has a vertex normal 420 (n0), boundary vertex 411 (V1) has a vertex normal 421 (n1), and boundary vertex 412 (V2) has a vertex normal 422 (n2). Triangle 400 also has neighbor 401 which shares edge 402 having common vertices 410 (V0) and 411 (V1). In FIG. 9, from the viewpoint of boundary vertex 411 (V1), edge 402 would be defined as edge 10. Thus, corner normal (n10) of vertex 411 (V1) is the normal in the corner of triangle 401 nearest boundary vertex 411 (V1), labeled 431 (n10). Similarly, corner normal (n01) of vertex 410 (V0) is the normal in the corner of triangle 301 nearest boundary vertex 410 (V0), labeled 430 (n01). Vertex and corner normals are used in the extrusion process for determining the coordinate of a subdivision point and its related normal vectors and is explained in further detail below.

Figure 10:
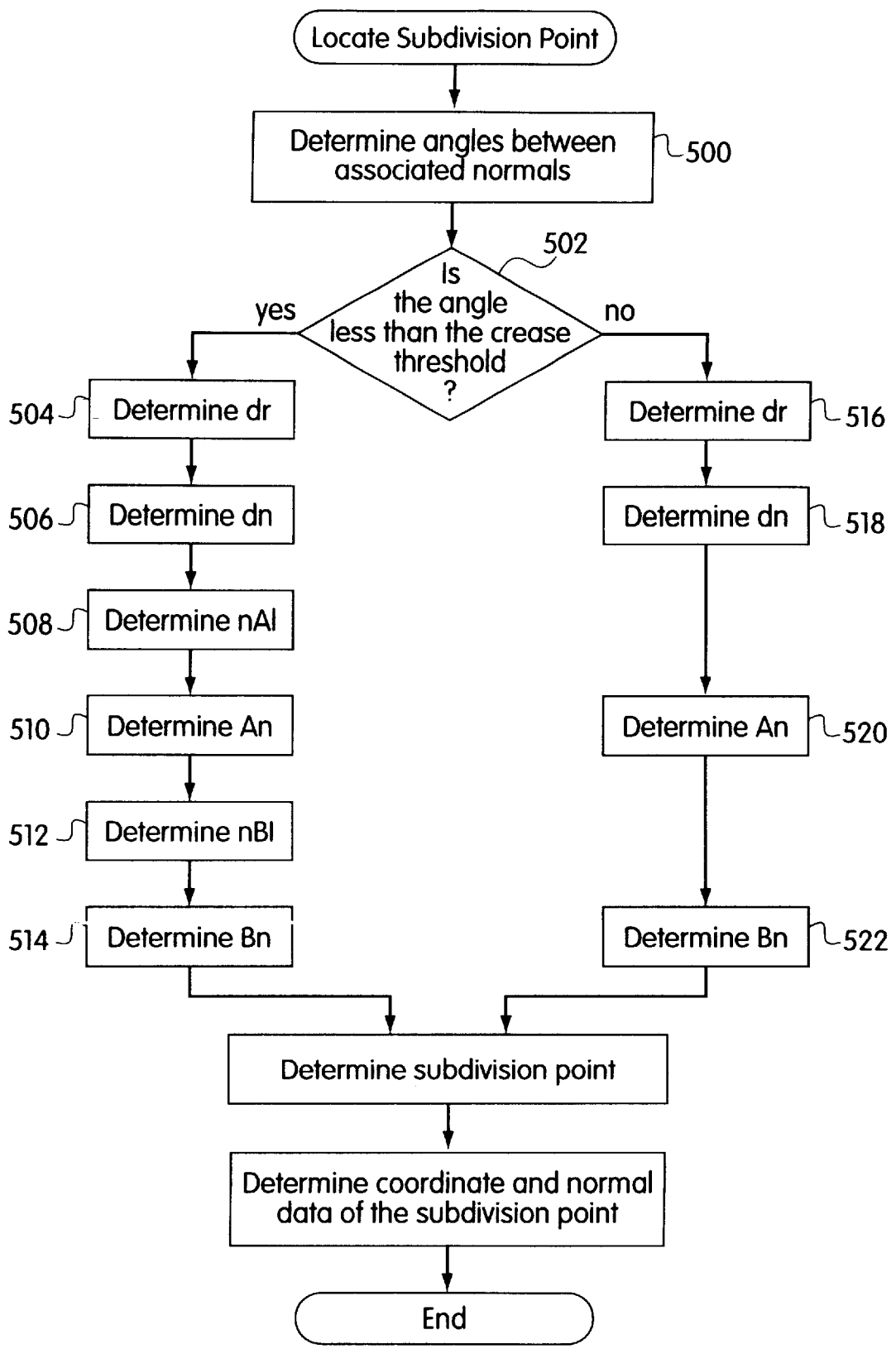
FIG. 10 shows an exemplary process for locating a subdivision point according to an exemplary embodiment of the present invention.

FIG. 10 shows an exemplary control process for determining the location of the subdivision point using the extrusion formula process as described with respect to steps 206, 212 and 218 of FIG. 6. It is understood that, at this point the processor has determined that the edge in question must be subdivided and the extrusion formula process will determine the X,Y,Z location of the point and compute the associated normal for that point. The exemplary control process shown in FIG. 10 is explained with reference to the first edge of the triangle, but the process is equally applicable to the other edges of the triangle. In the first step 500, the angles between associated normals of the edge are determined. The angle of interest is the angle between the vertex normal of the boundary vertex and its associated corner normal for the adjacent triangle. For example, for 402 in FIG. 9, the angle between point normal 420 (n0) and corner normal 430 (n01) and point normal 421 (n1) and corner normal 431 (n10) are determined. To further illustrate the described angle in FIG. 9, projections of vertex normal 421 (n1) and corner normal 431 (n10) are shown in dashed lines. As shown in FIG. 9, the projections of normal 421 (n1) and corner normal 431 (n10) intersect and an angle 403 is formed. As can be seen from FIG. 9, as the angle between the associated normals increases, the closer the two triangles 400 and 401 are to lying on the same plane.

For the special case situation of a "crease", the value above is compared against a crease threshold and a special flag is set. The crease threshold is a numerical value for an angle at which it is not necessary to consider the corner normal when carrying out the process of subdivision because the adjacent triangle lies in substantially the same plane as the triangle being subdivided. Those skilled in the art will understand that any crease threshold can be selected, but a smaller crease threshold will result in a smoother mesh model. In step 502, the process determines whether the angle between the associated normals is less than the crease threshold. If the angle is less than the crease threshold, the process proceeds to step 504 to determine the length (dr) between the vertices of the edge. For example, in FIG. 9, the length (dr) between vertex 410 (V0) and vertex 411 (V1) can be determined by subtracting the coordinates of vertex 410 (r0) from the coordinates of vertex 411 (r1). In step 506, the normal difference (dn) between the vertices of the edge are determined. For example, in FIG. 9, the normal difference (dn) between vertex 410 (V0) and vertex 411 (V1) can be determined by subtracting the normal 420 (n0) from normal 421 (n1).

The process then proceeds to step 508 to determine vector nA1. Vector nA1 is a vector cross product of the vertex normal and corner normal of the first vertex of the edge. For example, in initializing edge 402 in FIG. 9, vector nA1 would be the cross product of normal 420 (n0) and corner normal 430 (n01). In step 510, a coefficient. An is determined by the dot product of vector nA1 and length (dr). The process then proceeds to step 512 to determine vector nB1. Vector nB1 is a vector cross product of the vertex normal and corner normal of the second vertex of the edge. For example, in initializing edge 402 in FIG. 9, vector nB1 would be the cross product of normal 421 (n1) and corner normal 431 (n10). In step 514, a second coefficient Bn is determined by the dot product of vector nB1 and length (dr).

If, in step 502, the angle between the associated normals is greater than the crease threshold, the process proceeds to steps 516 and 518 to determine the length (dr) and the normal difference (dn), respectively. Steps 516 and 518 are identical to steps 504 and 506 described above. The process then proceeds to step 520 to determine the coefficient An. Determination of vertex normal in step 520 differs from the determination of vertex normal An in step 510. In particular, in step 520, coefficient An is determined by the dot product of the normal of the first vertex of the edge and length (dr). For example, for edge 402 in FIG. 9, determination of coefficient An in step 520 uses normal 420 (n0) and length (dr). The determination of coefficient Bn in step 522 differs from the determination of coefficient Bn in step 514. In step 522, coefficient Bn is determined by the dot product of the normal of the second vertex of the edge and length (dr).

From either step 514 or 522, the process proceeds to step 524 to compute the point of subdivision of the edge. The point of subdivision may be any point between the two boundary vertices, for example, the midpoint of the edge. Those skilled in the art will understand that there are numerous criteria for selecting and setting the point of subdivision. For example, if the midpoint of the edge is the desired point of subdivision, the length (dr) of the edge could be divided by two to determine the coordinates of the point of subdivision. The process then proceeds to step 526 to determine whether the subdivision criteria has been satisfied. As described above, acceptable subdivision criteria include, for example, if the angle between the vertex normals of these two boundary vertices is greater than a threshold value or the length of the edge is greater than a threshold value. An example of a criteria may be if the square of the distance between the coordinates of the first vertex and that of the second vertex, i.e., $dr^2$, is greater than a preselected value.

If the subdivision criteria is satisfied in step 526, the process proceeds to step 528, where the coordinates and normal of the subdivision point is determined. The following describes an exemplary extrusion formula, i.e., interpolating curve r(t) for smoothing the edges of the original mesh. Those skilled in the art will understand that there are an infinite number of curves smoothly passing through the given points with given normals. The purpose of presenting this exemplary extrusion formula is to more fully develop the specific processes for the adaptive subdivision of the present invention. The present invention is not limited to this exemplary extrusion formula, as those skilled in the art could present similar solutions for any number of the infinite number of interpolating curves.

This extrusion formula presented has the following properties: (1) it is the lowest order polynomial curve between vertices of a given recursion level; (2) the deviation from the straight line is bounded at every recursion level; (3) it can be proven to reach prescribed tolerance in the finite recursion level; and (4) it is relatively simple and can achieve real time performance on a PC-type computer using, e.g., a Pentium II processor. An extrusion formula is as follows:

$$r(t)=r_0(1-t)+r_1 t+t^2(1-t)N_A-t(1-t)^2 N_B \tag{1}$$

where $r_0$=coordinates of vertex 0

$r_1$=coordinates of vertex 1 t=subdivision fraction, e.g., midpoint is 0.5

$N_A$, $N_B$=coefficients of extrusion

Once again, it should be reiterated that other extrusion formulas may present other favorable properties suitable for a specific implementation, and the recitation of this exemplary extrusion formula should in no way be construed as limiting the present invention to this exemplary extrusion formula.

This formula can be solved using the previously determined variables to solve for the coordinates and normal of the subdivision point, as follows:

$$r=r_0+t*dr \tag{2}$$

$$n=n_0+t*dn \tag{3}$$

where r=coordinates of subdivision point $r_0$=coordinates of first vertex n=point normal of subdivision point $n_0$=point normal of first vertex These values for r and n are determined using linear interpolation, and therefore need to be corrected to lie on a curve because of the extrusion. In accordance with the example embodiment, In accordance with the example embodiment, the formulas for correcting the coordinates and point normal of the subdivision point are as follows:

$$t1 = 1 - t \quad (4)$$

$$tt1 = t*t1 \quad (5)$$

$$E1 = Bn*(t1*tt1) \quad (6)$$

$$E0 = An*(t1*tt1) \quad (7)$$

$$r\mathrel{+}= E1 - E0 \quad (8)$$

$$tt1 = tt1*3 \quad (9)$$

$$rdot = dr + An\,(tt1-t1) + Bn\,(tt1-t) \quad (10)$$

$$n = rdot*(rdot\cdot n)/(dr^2 + (An(tt1-t1))^2 + (Bn(tt1-t))^2) \quad (11)$$

Equation 8 corrects the coordinates of the subdivision point, and equation 11 adjusts the normal value of the subdivision point to be perpendicular to the derivative of the parameterizing curve r(t). The computed normal is then normalized. The location and extrusion process is then complete, and as previously described with respect to FIG. 6, the triangle is rendered based on the newly added subdivision points.

Alternative Embodiment: The following describes an exemplary process for implementing an alternative embodiment of the adaptive subdivision of the present invention through the presentation of a series of flow charts.

Main Routine

Figure 11A:
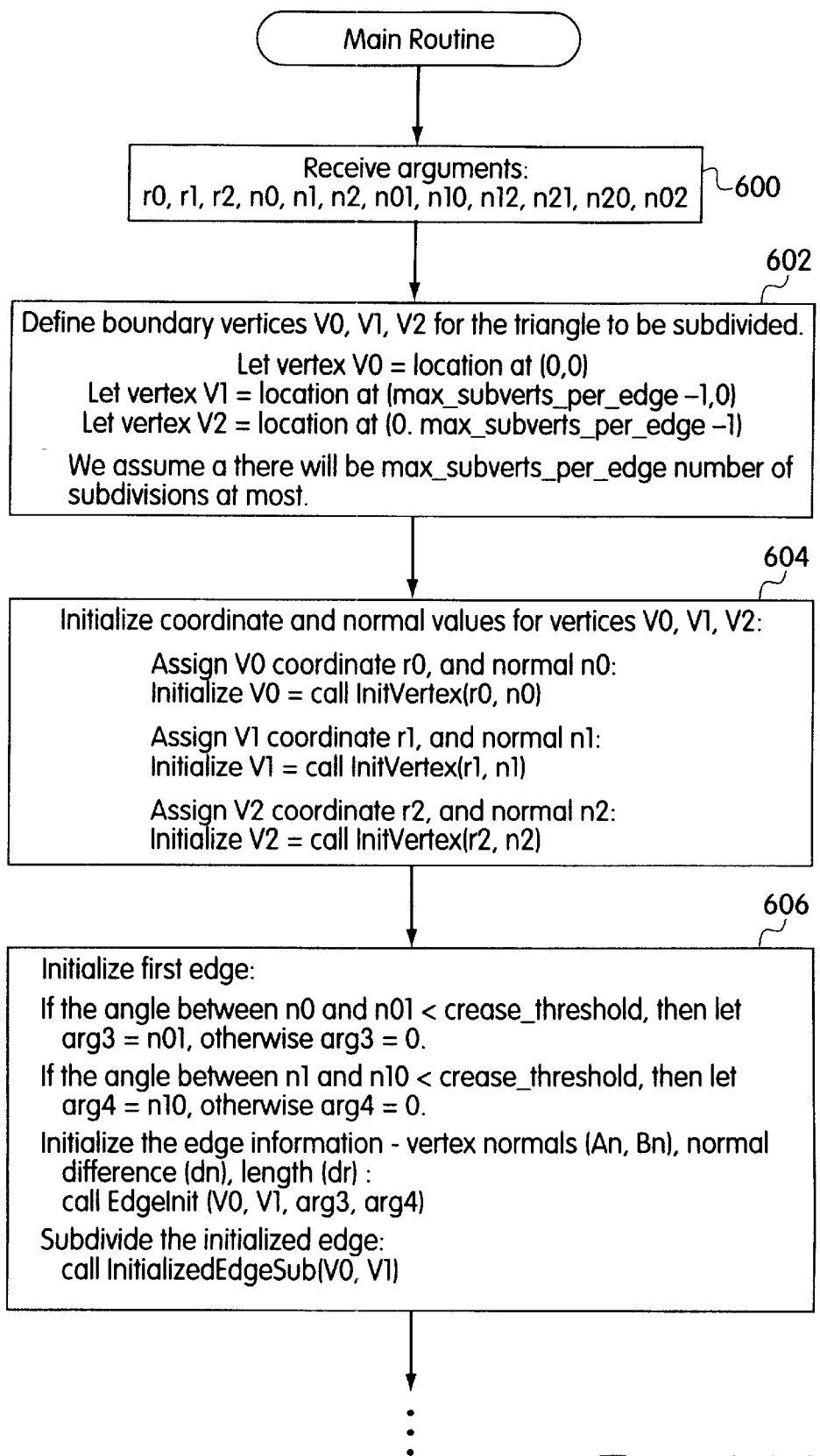
FIG. 11 shows an exemplary process for a main routine according to an alternative embodiment of the present invention.
Figure 11B:
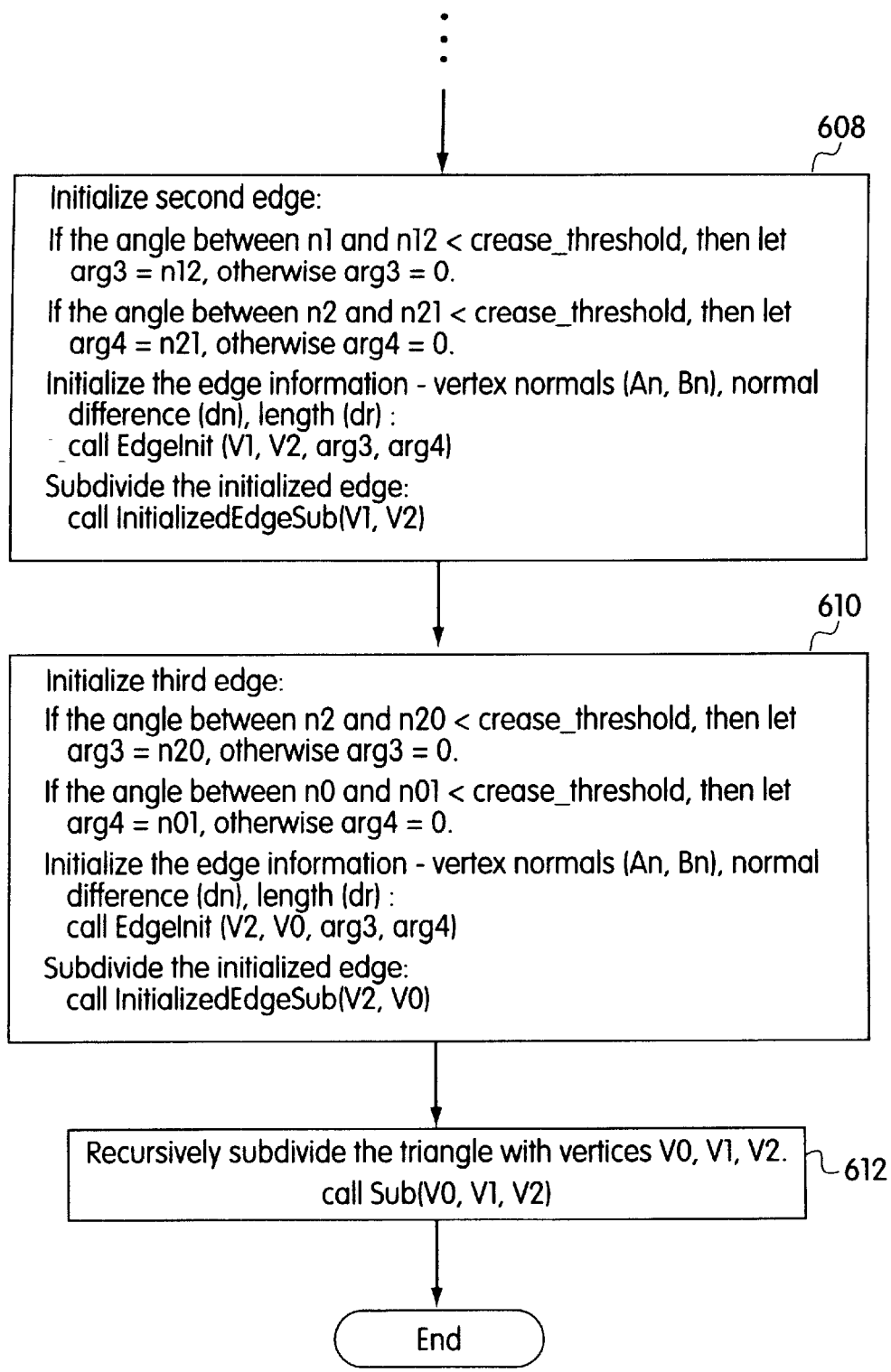

FIG. 11 illustrates a main routine of the alternative embodiment. In step 600, the process receives arguments r0, r1, r2, n0, n1, n2, n01, n10, n12, n21, n20, n02. As described above, r0, r1 and r2 are coordinates of data points, n0, n1 and n2 are point normals, and n01, n10, n12, n21, n20, and n02 are corner normals.

In step 602, boundary vertices V0, V1 and V2 are defined for the triangle to be subdivided. In defining the boundary vertices, a three-dimensional storage array of a finite size is initialized. The size of the array is bounded by an assumed maximum number of subvertices (subdivisions) per edge of the original triangle.

In step 604, the coordinates and normal values of the boundary vertices are initialized. Vertex V0 is assigned coordinate r0 and normal n0, vertex V1 is assigned coordinate r1 and normal n1, and vertex V2 is assigned coordinate r2 and normal n2. These assignments are made using a call to subroutine InitVertex( ) (not shown). It should be noted that there are two separate subroutines called InitVertex( ), the second InitVertex( ) subroutine will be described in greater detail below. This alternative exemplary embodiment may be implemented using the C++ programming language, for example, which allows two subroutines to be identified by the same name.

The process then proceeds to step 606 which initializes the first edge of the triangle to be subdivided. There are several subprocesses within step 606. The first subprocess determines whether the angle between the point normal n0 of V0 and corner normal n01 of V0 is less than a predetermined crease threshold. If the angle is less than the crease threshold, an argument, here arg3, is set equal to the corner normal n01. If the angle is not less than the crease threshold, arg3 is set equal to 0.

The next subprocess in step 606 determines whether the angle between the point normal n1 of V1 and corner normal n10 of V1 is less than the predetermined crease threshold. If the angle is less than the crease threshold an argument, here arg4, is set equal to the corner normal n10. If the angle is not less than the crease threshold, arg4 is set equal to 0. The use of these arguments will be described in greater detail below.

The next subprocess of step 606 initializes the edge information for the first edge by calling the subroutine EdgeInit( ). This edge information includes the vertex normals (An, Bn), the normal difference (dn) and the length (dr). This information is used to determine the coordinates and normals of subdivision points if the edge is subdivided. The final subprocess of step 606 subdivides the edge by calling the subroutine Initialized EdgeSub( ). This subprocess recursively subdivides the first edge based on a subdivision criteria that will be explained in greater detail below.

The process then proceeds to step 608 which initializes the second edge of the triangle to be subdivided. The functions carried out in step 608 for the second edge are identical to the functions described above in step 606 for the first edge. Specifically, step 608 (and its called subroutines) determine whether the second edge is to be subdivided. Additionally, the coordinates and normals for any subdivision point are computed. The functions then recursively subdivide the second edge based on the subdivision criteria that will be explained in greater detail below.

The process then proceeds to step 610 which initializes the third edge of the triangle to be subdivided. The functions carried out in step 610 for the third edge are identical to the functions described above in step 606 for the first edge. Specifically, step 610 (and its called subroutines) determine whether the third edge is to be subdivided. Additionally, the coordinates and normals for any subdivision point are computed. The functions then recursively subdivide the second edge based on the subdivision criteria that will be explained in greater detail below.

The process of the main routine then proceeds to step 612 which calls the subroutine Sub( ) to recursively subdivide the triangle having vertices V0, V1 and V2. After executing the call to the subroutine Sub( ), the main routine is complete and the original triangle is completely subdivided.

Sub( )

Figure 12A:
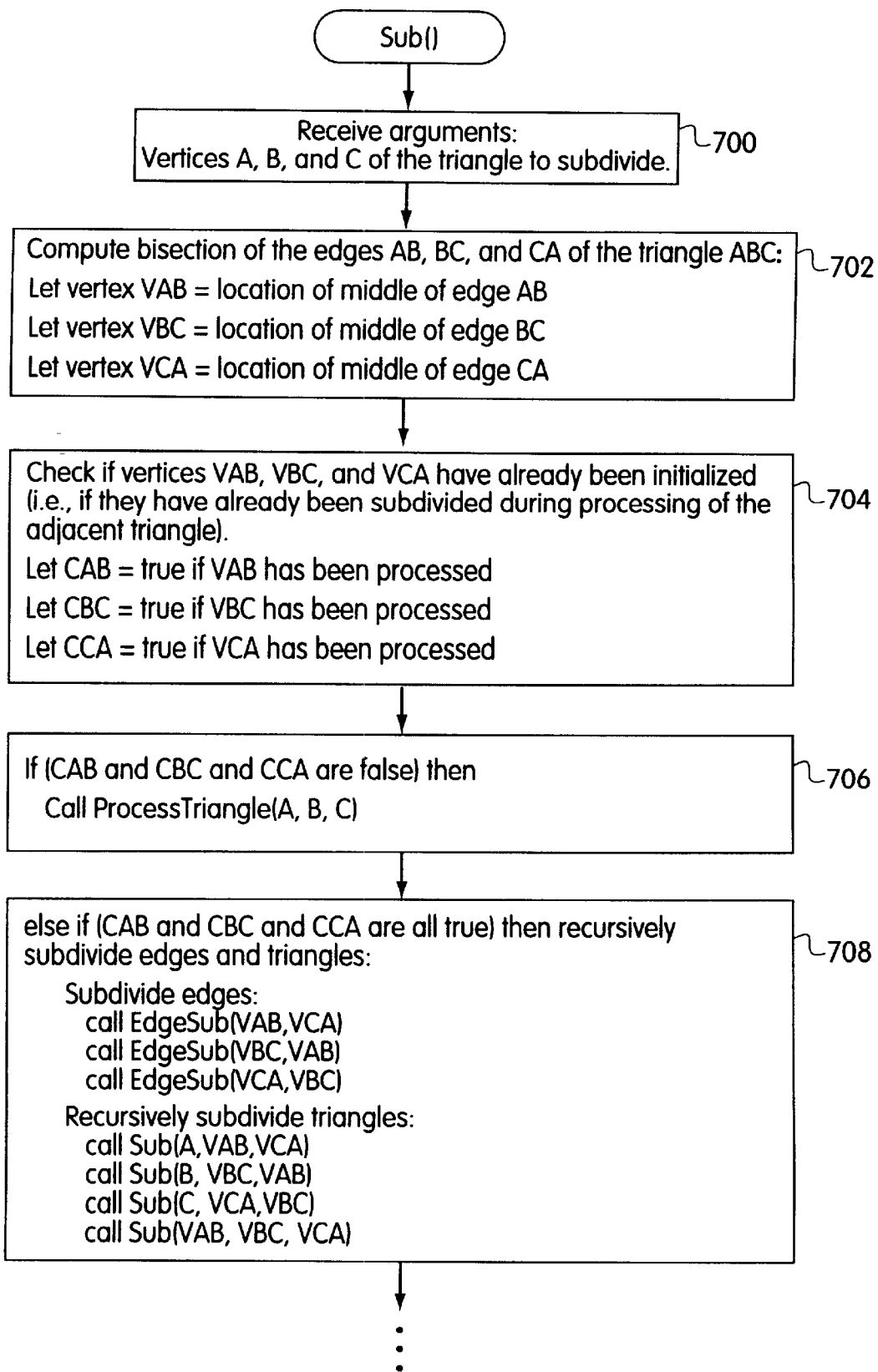
FIG. 12 shows an exemplary process for a Sub( ) routine according to an alternative embodiment of the present invention.

FIG. 12 illustrates an exemplary process of the subroutine Sub( ) of the alternative embodiment. This subroutine is called by the main routine to recursively subdivide the triangle. In step 700, the subroutine receives arguments for the vertices A, B and C (V0, V1, V2) of the triangle to be subdivided. In step 702, the bisection point of each of the edges AB (first edge), BC (second edge) and CA (third edge) is computed, i.e., vertex VAB is set to the midpoint of the first edge, vertex VBC is set to the midpoint of the second edge and vertex VCA is set to the midpoint of the third edge.

The process then proceeds to step 704 to determine whether these vertices have already been initialized. In this alternative embodiment, "initialized" means that the vertex has been selected as a subdivision point because the edge it lies on requires a subdivision. If a subdivision is required for an edge, the midpoint of the edge is initialized by determining the coordinates and normal for this point. Thus, in step 704 the process determines whether the midpoints of the edges of the triangle are initialized, i.e., the edge requires subdivision. For each initialized midpoint, a flag (CAB, CBC, CCA) is set to true.

The remainder of the subroutine steps 706–716 determine how to subdivide the triangle based on the settings of the flags. In particular, in step 706, the process determines whether the three flags are false, i.e., none of the edges require subdivision. If this is true, the process calls subroutine Process/triangle( ) to render the triangle, and the subdivision of original triangle is complete. The memory associated with this triangle optionally may be released after the triangle is rendered. Additionally, data associated with this triangle optionally may be stored in, for example, a file.

Figure 19:
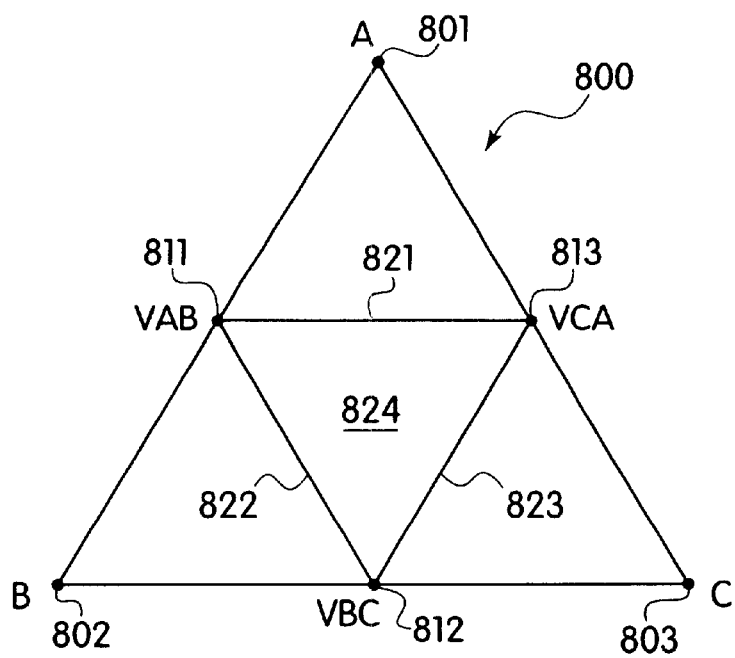
FIG. 19 shows an exemplary quadruple subdivision according the present invention.

If the condition of step 706 is not satisfied, the process proceeds to step 708 to determine whether all three flags are true, i.e., all of the edges require subdivision. As described above, if all three edges require subdivision, a quadruple subdivision is performed on the triangle. FIG. 19 illustrates a triangle subjected to quadruple subdivision according to the alternative embodiment of the present invention. Original triangle 800 (ABC) has vertices 801, 802, and 803 (A,B,C) and edge midpoints 811, 812 and 813 (VAB, VBC, VCA). Assuming that step 708 of FIG. 12 is being executed, each midpoint 811, 812 and 813 is initialized as defined by the alternative exemplary embodiment, i.e., each midpoint becomes a subdivision point, creating new edges 821, 822 and 823 between the initialized subdivision points by quadruple subdivision. It should be noted that these new edges will not be shown in the mesh until the new triangle 824 (VAB,VBC,VCA) is rendered which will not occur until all of of the edges of a triangle requiring subdivision have been appropriately subdivided.

The first subprocess of step 708 is to call the subroutine EdgeSub( ) for the edge VAB, VCA. As described above, VAB and VCA are the midpoints of the original first and third edges and the line connecting these two points is a new edge added to the original triangle as a result of the quadruple subdivision. Subroutine EdgeSub( ) determines if new edge 821 (VAB, VCA) needs to be subdivided. The next subprocess of step 708 is another call to subroutine EdgeSub( ) for the new edge 822 (VBC, VAB). As described above, EdgeSub( ) recursively subdivides new edge 822 and returns to step 708. EdgeSub( ) is then called one more time to recursively subdivide new edge 823 (VCA, VBC). When these subprocesses are complete, the process proceeds to the next set of subprocesses in step 708 which will recursively subdivide the four new triangles created from the original triangle by the quadruple subdivision. This subdivision of the new triangles is accomplished by repeatedly calling this routine, Sub( ), for each triangle. These triangles will be recursively subdivided until no further subdivision is required, i.e., step 706 of this routine is satisfied, and the triangles are rendered.

If the condition of step 708 is satisfied and the functions of step 708 are executed, the process is complete because the original triangle will be fully subdivided. However, if the condition of all three flags being set to true is not satisfied for step 708 to be executed, the process proceeds to step 710 which is executed if two of the three flags are set to true. As can be appreciated, there are three possible combinations where two of the three flags are true, e.g., CAB and CBC, CBC and CCA, and CCA and CAB. These three possible combinations are accounted for in the conditions of steps 710, 712 and 714. The following is a description of the process with reference to step 710, but it should be understood that steps 712 and 714 are similar.

Figure 20:
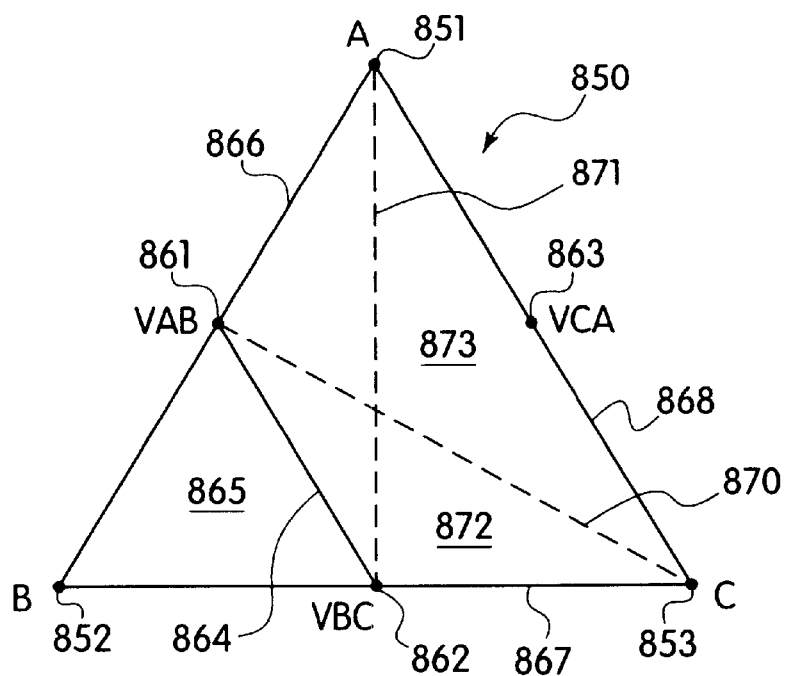
FIG. 20 shows an exemplary triple subdivision according the present invention.

As described above, if two of the three edges of an original triangle are to be subdivided, the triangle is divided by triple subdivision. FIG. 20 illustrates a triangle subjected to triple subdivision according to the alternative embodiment of the present invention. Original triangle 850 (ABC) has vertices 851, 852, and 853 (A,B,C) and edge midpoints 861, 862 and 863 (VAB, VBC, VCA). Assuming that step 710 of FIG. 12 is being executed, midpoints 861 and 862 (VBC, VAB) are initialized, i.e., midpoint become subdivision points creating new edges 864. Step 710 then calls subroutine EdgeSub( ) to recursively subdivide new edge 864. The next subprocess of step 710 recursively subdivides the new triangle formed by the new edge by repeatedly calling this subroutine, Sub( ), for that triangle. For example, in FIG. 20, new edge 864 forms new triangle 865 (B, VAB, VBC), which is recursively subdivided until no further subdivision is required, i.e., step 706 of this routine is satisfied, and the triangles are rendered.

The next subprocess of step 710, i.e., subroutine ChooseLink( ), compares two edges to determine which of the two edges is best to subdivide. As described above, when only two edges of a triangle are to be subdivided, triple subdivision occurs. Referring to FIG. 20, when edge 866 (AB) and 867 (BC) are to be subdivided, new edge 864 (VAB, VBC) will be part of the triple subdivision. However the second new edge of the triple subdivision may be either new edge 870 (C, VAB) or new edge 871 (A, VBC). Subroutine ChooseLink will determine which of the two edges to use for the second edge of triple subdivision based on the length of each edge, with the longer edge being selected for the subdivision. It should be noted that length is not the only criteria that can be used to make this selection. After the second edge of subdivision is selected, step 710 calls subroutine EdgeSub( ) to recursively subdivide this chosen edge. Additionally, the selection of the second edge will also form two new triangles, for example, in FIG. 20, if the second edge was chosen to be edge 870 (C, VAB), two new triangles 872 (C, VAB, VBC) and 873 (C,A,VAB) are formed. Step 710 recursively subdivides these two new triangles by repeatedly calling this subroutine, Sub( ), for that triangle, until no further subdivision is required, i.e., step 706 of this routine is satisfied, and the triangles are rendered.

If the conditions of steps 710–714 are satisfied and the functions of these steps are executed, the process is complete because the original triangle will be fully subdivided. However, if these conditions are not satisfied, the process proceeds to step 716 which is executed if only one of the three flags are set to true. As can be appreciated, there are three possibilities for one of the three flags being true, e.g., CAB, CBC, CCA. These three possibilities are accounted for in subprocesses of step 716. The following is a description of the one subprocess of step 716, but it should be understood that the other subprocesses of step 716 are similar. As described above, if one of the three edges of an original triangle are to be subdivided, the triangle is divided by double subdivision. In double subdivision, as shown in FIG. 7, only a single new edge 314 is added. Step 716 calls subroutine EdgeSub( ) to recursively subdivide this new edge. The next subprocess of step 716 is to recursively subdivide the two new triangles formed by the new edge by repeatedly calling this subroutine, Sub( ), for these triangles, until no further subdivision is required, i.e., step 706 of this routine is satisfied, and the triangles are rendered. When step 716 is complete this subroutine is complete and the process returns to the main routine.

EdgeSub( )

Figure 13:
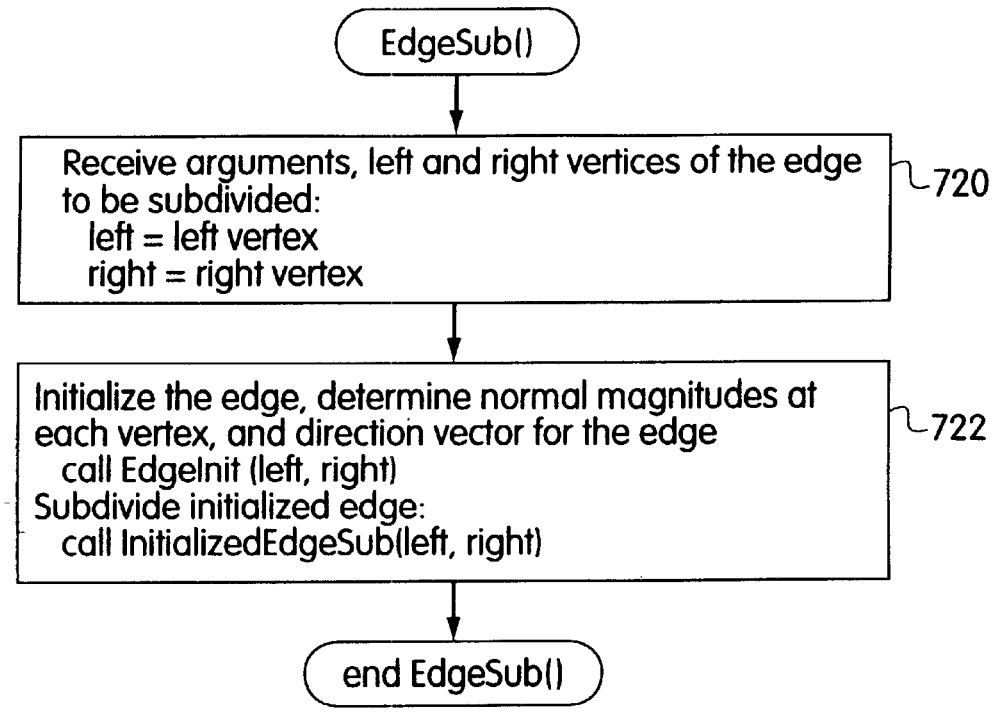
FIG. 13 shows an exemplary process for a EdgeSub( ) routine according to an alternative embodiment of the present invention.

FIG. 13 illustrates an exemplary process of subroutine EdgeSub( ) called by the subroutine Sub( ) of the alternative embodiment. In step 720, the subroutine sets arguments for the left and right vertices of the edge to be subdivided, for example, vertex VAB and VCA. The process then proceeds to step 722 where, in a first subprocess, subroutine EdgeInit( ) is called to determine the normal magnitudes and direction vector for the edge. In a next subprocess of step 722, the edge is subdivided by calling the subroutine InitializedEdgeSub( ) which, with its associated subroutines, recursively subdivides the edge until the subdivision criteria is satisfied, i.e., no further subdivisions are required. When the recursive subdivision of the edge is complete, subroutine EdgeSub( ) is complete and the process returns to the calling routine.

InitializedEdgeSub( )

Figure 14:
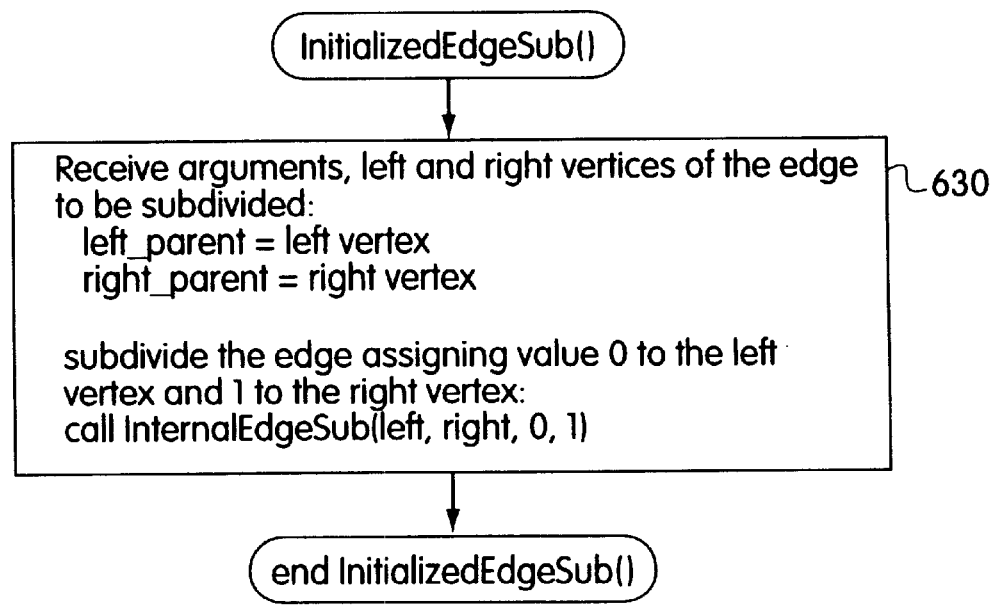
FIG. 14 shows an exemplary process for a Initialized EdgeSub( ) routine according to an alternative embodiment of the present invention.

FIG. 14 illustrates an exemplary process of the subroutine InitializedEdgeSub( ), which is called by the main routine and the subroutine EdgeSub( ), of the alternative embodiment. InitializedEdgeSub ( ) receives arguments, i.e., the left vertex and right vertex, to be used for subdivision. The edge between left vertex and right vertex edge is then subdivided by calling the subroutine InternalEdgeSub( ).

InternalEdgeSub( )

Figure 15:
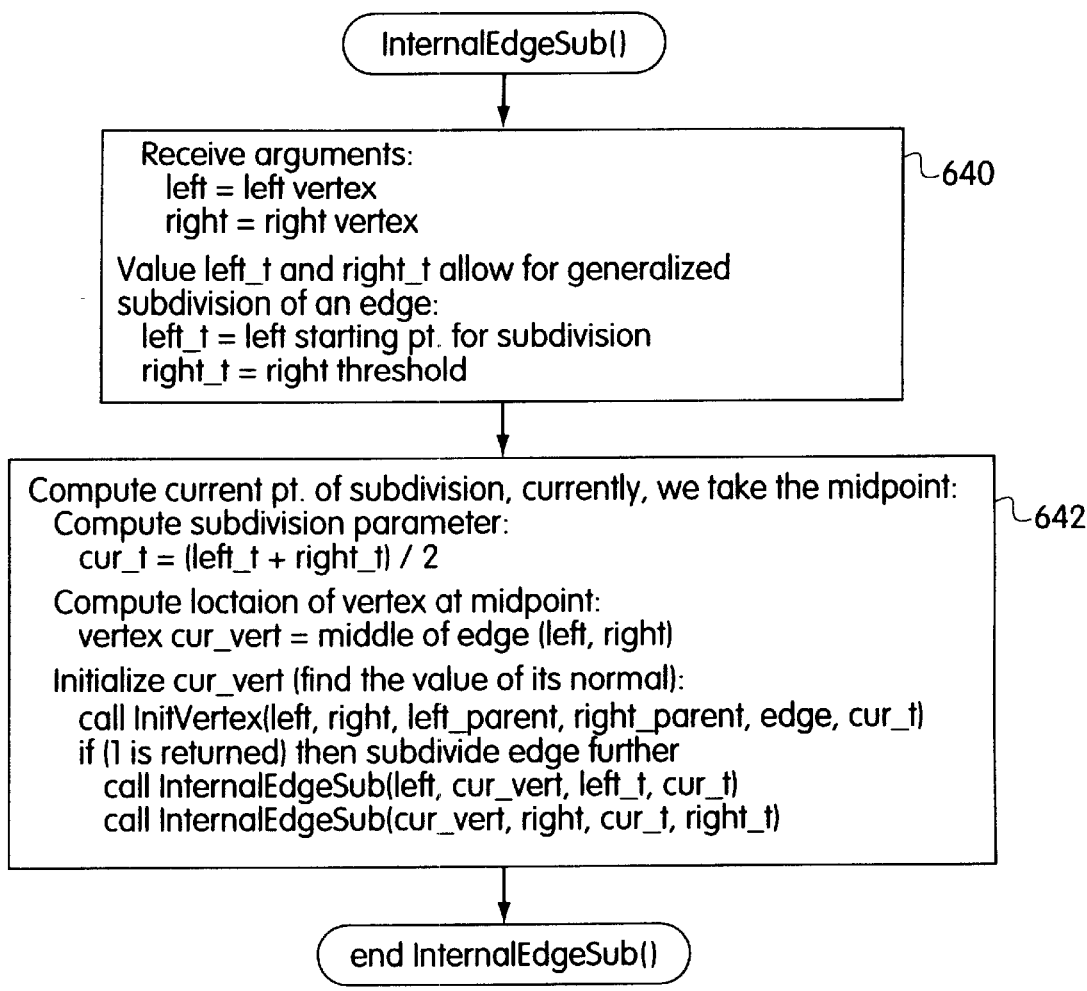
FIG. 15 shows an exemplary process for a Internal EdgeSub( ) routine according to an alternative embodiment of the present invention.

FIG. 15 illustrates an exemplary process of the subroutine InternalEdgeSub( ) of the alternative embodiment. In step 640, the subroutine receives arguments, i.e., the left and right vertices, and sets values for these vertices. In this case the value for the left vertex (left_t) is set to 0 and the value for the right vertex (right_t) is set to 1. The subroutine then proceeds to step 642 which hag several subprocesses. In the first subprocess, the current subdivision point is computed by adding the values of the left and right vertices and dividing by 2. For example, if, as described above, the left vertex value is 0 and the right vertex value is 1, the current subdivision point would be 0.5, or the midpoint of the first edge the next subprocess of step 642 computes the location of the subdivision point at the midpoint of the original edge. Next, the subroutine InitVertex( ) is called which determines the normal of the subdivision point.

The process proceeds to the next subprocess of step 642 if a routine of InitVertex( ) returns a value of 1 (indicating that subdivision is required). The next subprocess determines whether the edge should be further subdivided. Step 642 shows that the this same subroutine is called recursively to continue subdividing the new segments formed by the original vertices and the new vertex at the subdivision point. The process for subdividing these new segments is the same as described above in connection with the original edge between vertices V0 and V1, i.e., determining a point of subdivision including its coordinates and normals. This recursive subdivision will continue until the subdivision criteria, as will be described in greater detail below, returns a value of 0 (no subdivision required) for all segments. When no further subdivision is required, InternalEdgeSub( ) ends.

EdgeInit( )

Figure 16A:
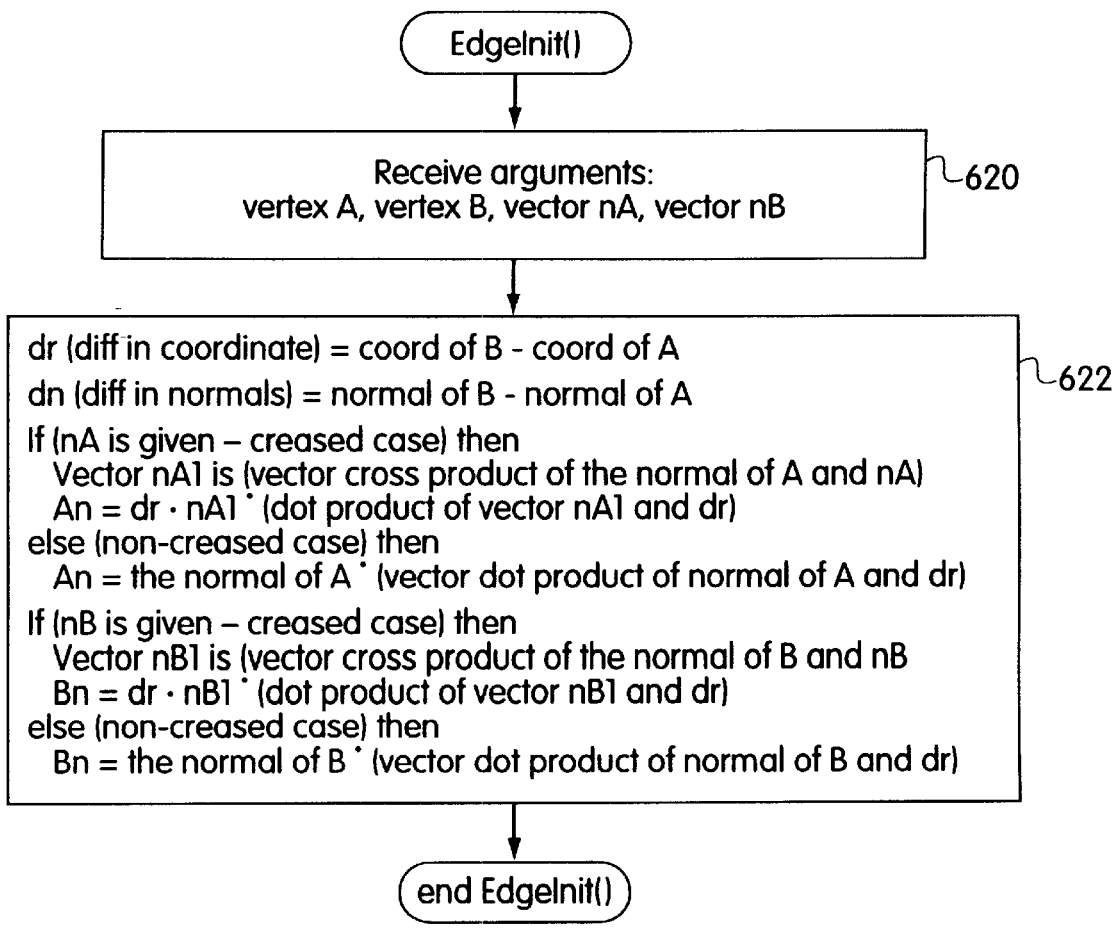
FIG. 16 shows an exemplary process for a EdgeInit( ) routine according to an alternative embodiment of the present invention.
Figure 16B:
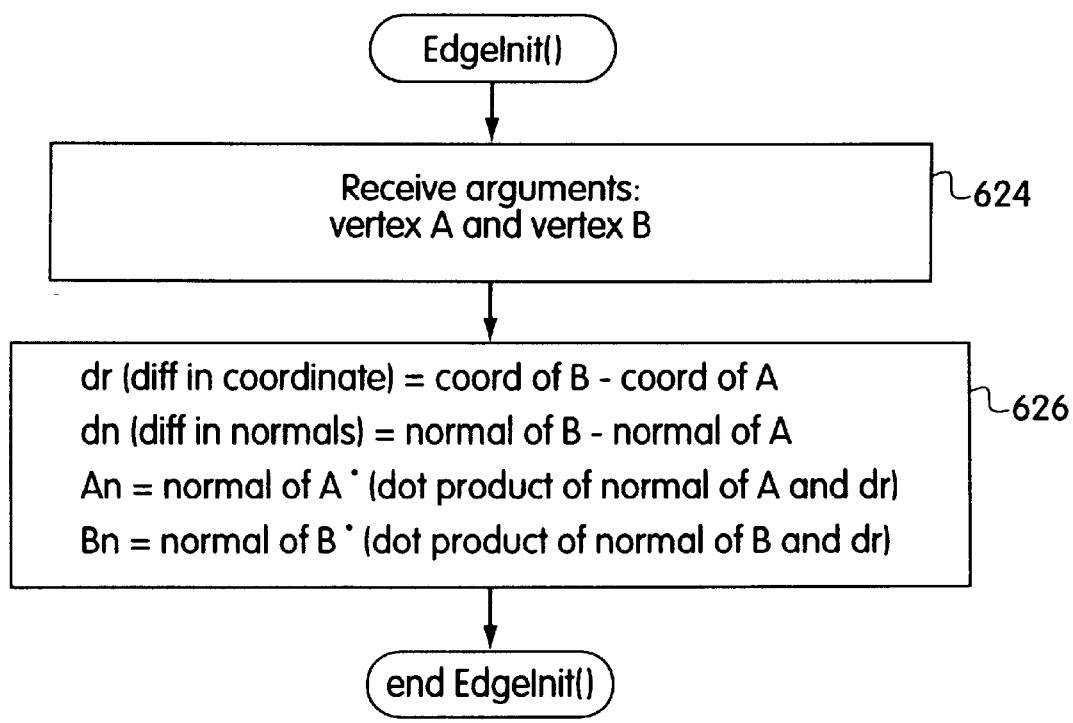

There are two subroutines for EdgeInit( ) illustrated in FIGS. 16a and 16b. The subroutine EdgeInit( ) in FIG. 16a is called by the main routine and receives arguments for two vertices in the original triangle and normals associated with these vertices. The subroutine EdgeInit( ) in arguments for two vertices. FIG. 16 illustrates an exemplary process of the subroutine EdgeInit( ) called by the main routine of the alternative embodiment. In step 620, the subroutine receives the arguments vertex A, vertex B, vector nA and vector nB from the calling routine, i.e., main( ). In this case, vertex A is V0, vertex B is V1, vector nA is arg3, and vector nB is arg4. Step 622 of the subroutine has several subprocesses. The first subprocess is to determine the length (dr) of the first edge (from V0 to V1) by subtracting the coordinates of A, which is r0 of V0, from the coordinates of B, which is r1 of V1. The next subprocess of step 622 is to determine the normal difference (dn) between the two vertices V0 and V1 of the first edge by subtracting the normal of A (vertex normal n0) from the normal of B (vertex normal n1).

The next subprocess of step 622 is to determine the vertex normal (An) of the first vertex V0 of the first edge. There are two different manners to determine An depending on whether the edge is a creased or non-creased case. As described above, arg3 was set based on whether the angle between the point normal n0 and corner normal n01 was less than the crease threshold. If arg3 is set to n01, then it is a creased case, whereas if arg3 is set to 0, it is a non-creased case. As described above, the crease threshold is a numerical value for an angle at which it is not necessary to consider the corner normal when carrying out the process of subdivision because the adjacent triangle lies in substantially the same plane as the triangle being subdivided (non-creased case). In the creased case, the vertex normal (An) is determined by first calculating the vector nA1 by taking the vector cross product of the normal of A and nA (n0×n01). Then An can be found by subtracting nA1 from length dr and multiplying by the dot product of nA1 and dr. In the non-creased case, An can be determined by multiplying the normal of A (n0) by the dot product of the normal of A (n0) and dr.

The next subprocess of step 622 is to determine the vertex normal (Bn) of the second vertex V1 of the first edge. Once again, the determination of Bn is dependant on whether it is a creased or non-creased case, which, in the case of Bn, is determined by whether arg4 has been set equal to n10 or 0 in the main routine. Bn is determined in the same manner as described above for An (with the substitution of the appropriate value of V1) as in a previous subprocess of this same step. After the determination of Bn, EdgeInit( ) ends.

FIG. 16b illustrates an exemplary process of the subroutine EdgeInit( ) called by the subroutine EdgeSub( ) of the alternative embodiment. In step 624, the subroutine receives the arguments vertex A and vertex B, from the calling routine, i.e. EdgeSub( ). Step 626 of the subroutine has several subprocesses. The first subprocess is to determine the length (dr) of the first edgte by subtracting the coordinates of A, from the coordinates of B. The next subprocess of 626 is to determine the normal difference (dn) between the two vertices by subtracting the normal vertex A from the normal vertex B.

The next subprocess of step 626 is to determine the vertex normal (An) and the first vertex, by multiplying the normal of A by the dot product of the normal of A and dr.

InitVertex( )

Figure 17:
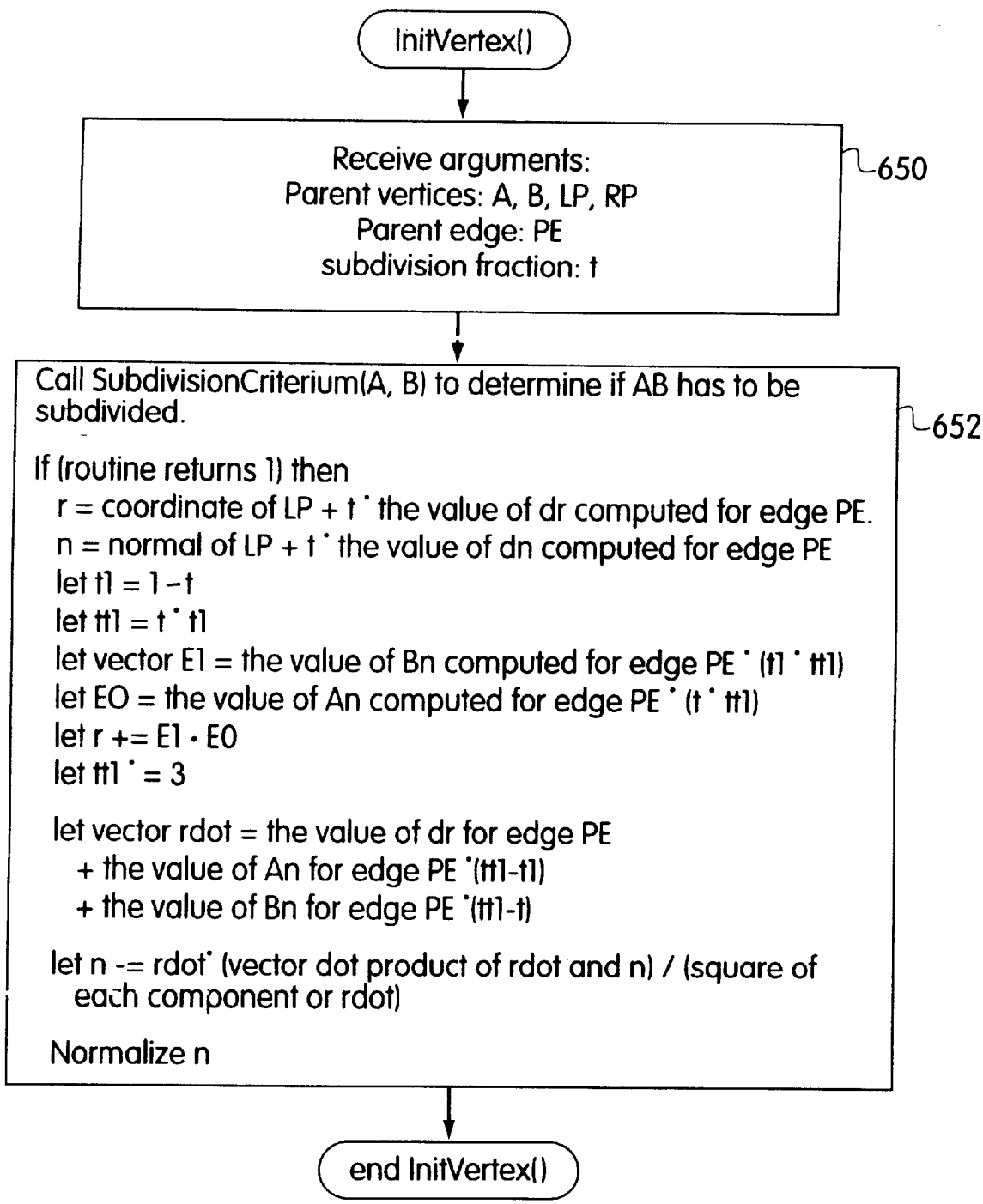
FIG. 17 shows an exemplary process for a InitVertex( ) routine according to an alternative embodiment of the present invention.

FIG. 17 illustrates an exemplary process of the subroutine InitVertex( ) of the alternative embodiment. As described above, there are two subroutines with the name InitVertex( ). The first InitVertex( ) merely receives and stores arguments (a separate flow chart is not provided). The InitVertex( ) subroutine described with reference to FIG. 17 performs various functions.

In first step 650, arguments are received by the subroutine. The process then proceeds to step 652 which contains various subprocesses. The first subprocess determines if the edge needs to be subdivided by calling the subroutine SubdivisionCriterium( ) (described below).

If the routine SubdivisionCriterium( ) returns a value of 1 (subdivision required), the next the coordinate and value of the normal at the vertex which was determined to be the subdivision point for the edge. As shown in FIG. 17, the process requires several equations to determine the coordinates and normals. These equations and the extrusion formula were described in detail above. The vertex information dr, dn, An, and Bn needed to solve these equations was previously determined and stored by subroutine Edgeinit( ) described with reference to FIG. 16. After the determination of the coordinate and normal data for the subdivision point or if the routine of SubdivisionCriterium( ) returns a value of 0 (subdivision not required), InitVertex( ) ends.

SubdivisionCriterium( )

Figure 18:
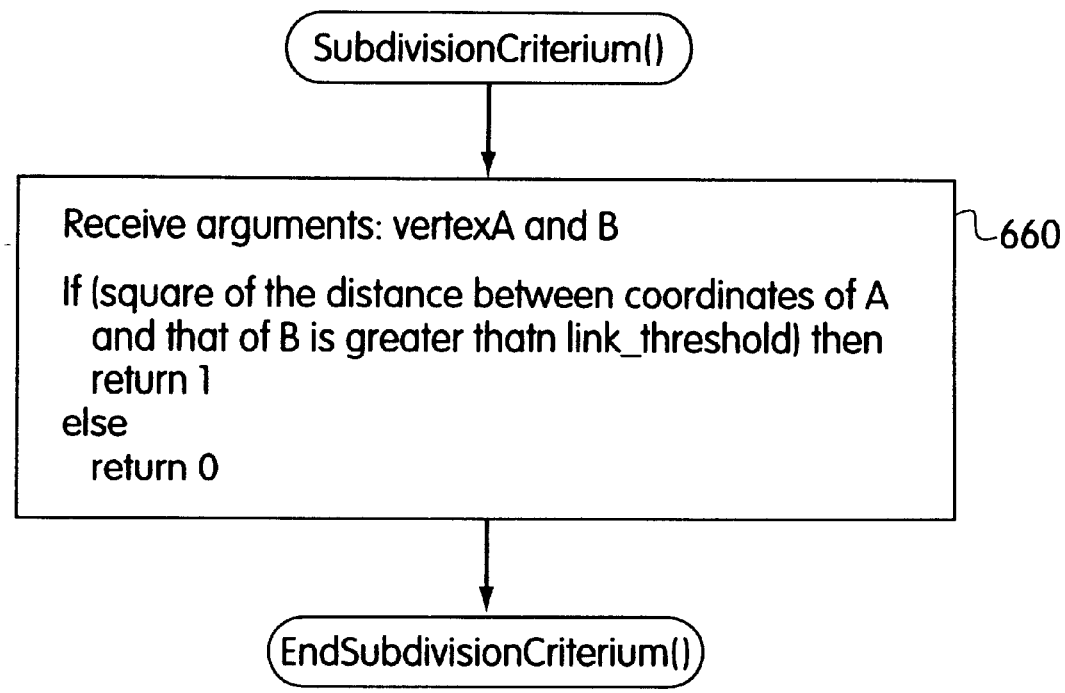
FIG. 18 shows an exemplary process for a Subdivision Criteria routine according to an alternative embodiment of the present invention.

FIG. 18 illustrates an exemplary process of the subroutine SubdivisionCriterium( ) of the alternative embodiment. In step 660, this subroutine receives arguments for vertices of the edge to be subdivided and then determines whether the edge should be subdivided. The subdivision criteria is whether the square of the distance between the coordinates is greater than a threshold value. If the calculated value is greater than the threshold value, the subroutine returns a value 1 signaling that a subdivision of the edge should occur. If the calculated value is less than the threshold value, no subdivision is required. As described above, the threshold value may be set by the user and determines the level of refinement in the final refined mesh. Additionally, as described above, this subdivision criteria is symmetrical because it uses properties from both vertices of the edge that is being checked. After the determination of the subdivision criteria, SubdivisionCriterium( ) ends.

Figure 21:
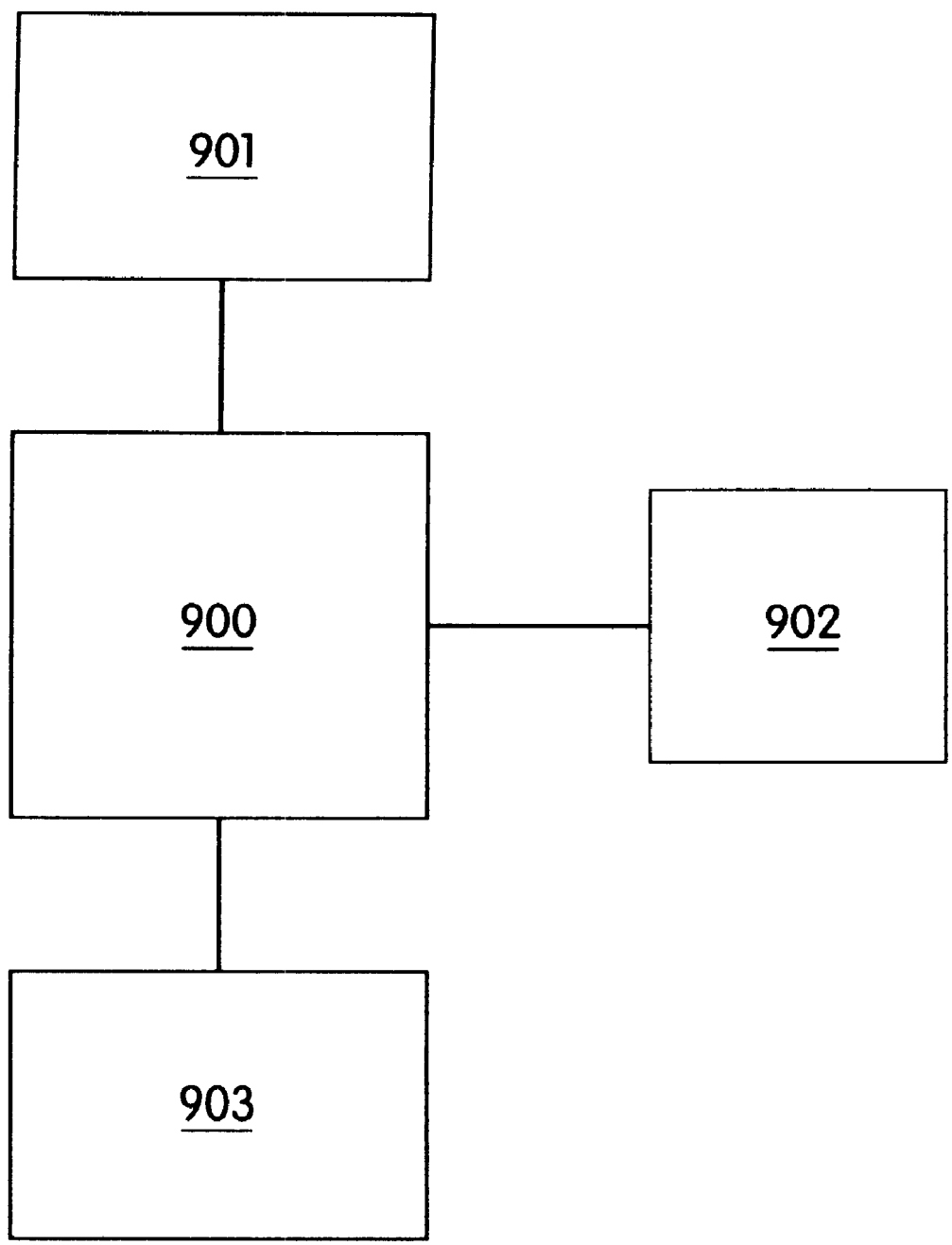
FIG. 21 shows an exemplary system for implementing the present invention.

Those skilled in the art will understand that the system and method of the present invention can be implemented using a processor. For example, FIG. 21 shows a processor 200 committed to a memory 902, a graphics system 901 and an input device 903. The memory can be, for example, ROM, RAM, CD-ROM, Floppy disk, etc. The input device can be for example, keyboard, a mouse, a scanner, etc. the display system can be, for example, a video display, a graphics generator, printer, etc.

The invention continues as described above. The above described embodiment of the invention is meant to be representative only, as certain changes may be made therein without departing from the clear teachings of the invention. Accordingly, reference should be made to the following claims which alone define the invention.

What is claimed is:

1. A computer-based system for smoothing a mesh model of a three-dimensional object or surface, the mesh model having a set of connected faces, each face being a geometric shape with a predetermined number of vertices and a corresponding number of edges, each edge connecting two of the predetermined number of vertices, each vertex being a data point describing the object or surface, the computer, including a processor coupled to a memory, the system comprising:

a subdivision element to check a first edge against a predetermined subdivision criteria;

an insertion element to insert a new subdivision point along the first edge, the new subdivision point being inserted depending on whether or not the first edge meets the predetermined subdivision criteria; and an extrusion element to extrude the new subdivision point so that it lies on a curve, wherein the curve passes through the vertices connected by the first edge orthogonal to normal vectors at the vertices.

2. The computer-based system according to claim 1, wherein the subdivision criteria includes a procedure that determines whether a square of a distance between vertex coordinates of the first edge is greater than a threshold value, the insertion element inserting the new subdivision point if the distance is greater than the threshold value.

3. The computer-based system according to claim 1, wherein the subdivision criteria includes a procedure that determines vertex normals of vertices of the first edge, the insertion element inserting the new subdivision point if an angle between the vertex normals is greater than a threshold value.

4. A method for refining a mesh model of a three-dimensional object or shape, the mesh model including a plurality of first geometric shapes, comprising the steps of:

selecting at least one of the first geometric shapes;

recursively subdividing each of the selected first geometric shapes into a plurality of second geometric shapes; and displaying each of the plurality of second geometric shapes.

5. The method according to claim 4, wherein the step of recursively subdividing includes the steps of:

for each respective edge of each of the first geometric shapes, determining whether to subdivide the edge as a function of a predetermined subdivision criteria, and subdividing the respective edge if a square of a distance between vertex coordinates of the respective edge is greater than a threshold value.

6. The method according to claim 4, wherein the step of recursively subdividing includes the steps of:

for each respective edge of each of the first geometric shapes, determining vertex normals of vertices of the first edge, and subdividing the respective edge if an angle between the vertex normals is greater than a threshold value.

7. A method for refining a mesh model of a three-dimensional object or shape, the mesh model including a plurality of first geometric shapes having edges, comprising the steps of:

selecting at least one of the first geometric shapes;

for each one of the edges of the selected geometric shapes:
  i) determining if the one of the edges meets a predetermined subdivision criteria; and
  ii) if the one of the edges meets the predetermined criteria, subdividing the one of the edges; and subdividing each of the selected first geometric shapes into a plurality of second geometric shapes as a function of the subdivided edges.

8. The method according to claim 7, wherein the determining step includes comparing a square of a distance between vertex coordinates of the one of the edges to a threshold value, and wherein the one of the edges is subdivided if the square of the distance is greater than the threshold value.

9. The method according to claim 7, wherein the determining step includes comparing an angle between vertex normals of the one of the edges to a threshold value, wherein the one of the edges is subdivided if the angle is greater than the threshold value.

* * * * *

UNITED STATES PATENT AND TRADEMARK OFFICE
CERTIFICATE OF CORRECTION

PATENT NO. : 6,356,263 B2
DATED : March 12, 2002
INVENTOR(S) : Migdal et al.

It is certified that error appears in the above-identified patent and that said Letters Patent is hereby corrected as shown below:

<u>Column 7,</u>
Line 12, change "examined respect to" to -- examined with respect to --.

Signed and Sealed this

Twenty-fifth Day of February, 2003

JAMES E. ROGAN
*Director of the United States Patent and Trademark Office*